US012542695B2

(12) United States Patent
Tsai

(10) Patent No.: US 12,542,695 B2
(45) Date of Patent: *Feb. 3, 2026

(54) COOPERATION WITH DIGITAL FREQUENCY-TRANSLATION REPEATER FOR UPLINK TRANSMISSION AND RECEPTION-BASE STATION BEHAVIOR

(71) Applicant: MEDIATEK INC., Hsinchu (TW)

(72) Inventor: Lung-Sheng Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 172 days.

This patent is subject to a terminal disclaimer.

(21) Appl. No.: 18/141,487

(22) Filed: May 1, 2023

(65) Prior Publication Data
US 2023/0388155 A1  Nov. 30, 2023

Related U.S. Application Data

(60) Provisional application No. 63/347,043, filed on May 31, 2022.

(51) Int. Cl.
*H04L 25/02* (2006.01)
*H04B 7/0456* (2017.01)
*H04L 27/26* (2006.01)

(52) U.S. Cl.
CPC ......... *H04L 25/022* (2013.01); *H04B 7/0456* (2013.01); *H04L 27/26025* (2021.01)

(58) Field of Classification Search
None
See application file for complete search history.

(56) References Cited

U.S. PATENT DOCUMENTS 11,606,129 B1 * 3/2023 Kanno ................. H04B 7/0632
2007/0015526 A1 * 1/2007 Hansen ............. H04L 25/03292
455/509

(Continued)

FOREIGN PATENT DOCUMENTS

CN  101908949 A  12/2010
CN  102724027 B  4/2015

(Continued)

OTHER PUBLICATIONS

Taiwan Patent Office, "Office Action", Feb. 19, 2024, Taiwan.

(Continued)

*Primary Examiner* — Hassan A Phillips
*Assistant Examiner* — Gautam Sharma
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a base station. The base station receives baseband signals from X devices at $N_R$ reception antennas. These baseband signals carry R layers of data signals transmitted from a UE using $N_T$ transmission antennas in L first transmission time intervals, where L, $N_R$ and R are positive integers. The base station estimates an equivalent channel response that is formed by precoders used by the UE and a channel between the $N_R$ reception antennas at the base station and $L \cdot N_T$ effective antennas at the UE; $N_T$ is a positive integer. The base station performs signal processing based on the received baseband signals and the channel response in order to decode the R layers of data signals from the UE.

20 Claims, 14 Drawing Sheets

(56) References Cited

U.S. PATENT DOCUMENTS

| | | | |
|---|---|---|---|
| 2009/0122929 A1* | 5/2009 | Yu | H04L 25/0204 |
| | | | 375/346 |
| 2014/0133471 A1* | 5/2014 | Nammi | H04L 1/06 |
| | | | 370/336 |
| 2018/0123837 A1* | 5/2018 | Barbu | H04L 25/03987 |
| 2018/0287834 A1* | 10/2018 | Wesemann | H04L 25/0238 |
| 2020/0169313 A1* | 5/2020 | Kotecha | H04B 7/0619 |
| 2021/0044407 A1* | 2/2021 | Lomayev | H04L 25/0224 |
| 2023/0388979 A1* | 11/2023 | Tsai | H04L 27/2646 |
| 2025/0185908 A1* | 6/2025 | Ko | A61B 3/1233 |

FOREIGN PATENT DOCUMENTS

| | | |
|---|---|---|
| CN | 105187115 A | 12/2015 |
| CN | 109672505 A | 4/2019 |

OTHER PUBLICATIONS

3GPP TR 38.867 V0.1.0 2022, 3rd Generation Partnership Project; Technical Specification Group Radio Access network; Study on NR network-controlled repeaters; (Release 18).

* cited by examiner

COOPERATION WITH DIGITAL FREQUENCY-TRANSLATION REPEATER FOR UPLINK TRANSMISSION AND RECEPTION-BASE STATION BEHAVIOR

CROSS-REFERENCE TO RELATED APPLICATION(S)

This application claims the benefits of U.S. Provisional Application Ser. No. 63/347,043, entitled "COOPERATION WITH DIGITAL FREQUENCY-TRANSLATION REPEATER OVER DIFFERENT FR FOR UL TRANSMISSION-GNB BEHAVIOR" and filed on May 31, 2022. The content of the application above is expressly incorporated by reference herein in its entirety.

BACKGROUND

Field

The present disclosure relates generally to communication systems, and more particularly, to techniques of forming distributed MIMO receivers.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The base station receives baseband signals from X devices at $N_R$ reception antennas. These baseband signals carry R layers of data signals transmitted from a UE using $N_T$ transmission antennas in L first transmission time intervals corresponding to a first subcarrier spacing, where X, L, $N_R$ and R are positive integers. The base station estimates an equivalent channel response that is formed by precoders used by the UE and a channel between the $N_R$ reception antennas at the base station and L·$N_T$ effective antennas at the UE. $N_T$ is a positive integer. The base station performs signal processing based on the received baseband signals and the channel response in order to decode the R layers of data signals from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
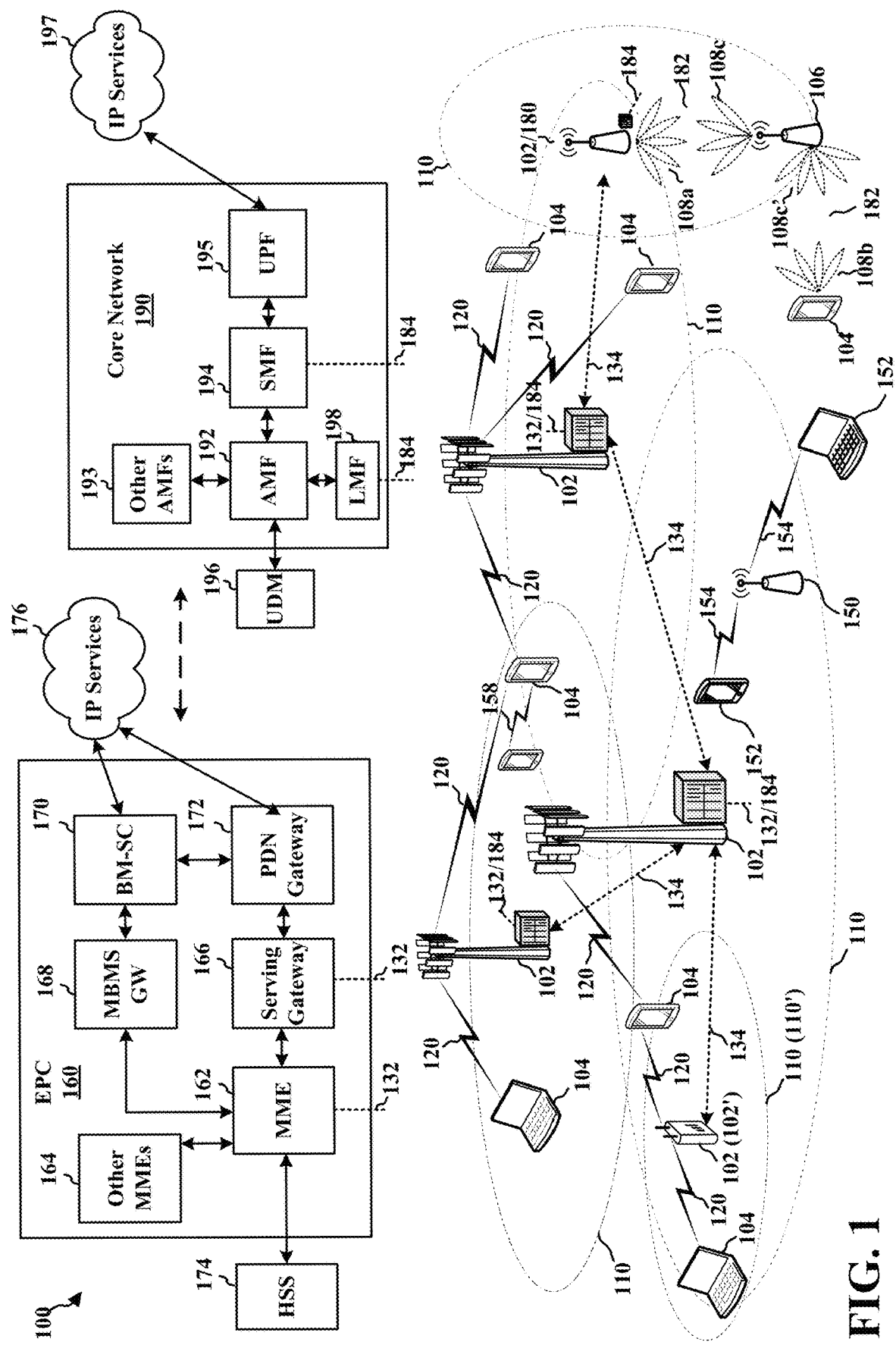
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
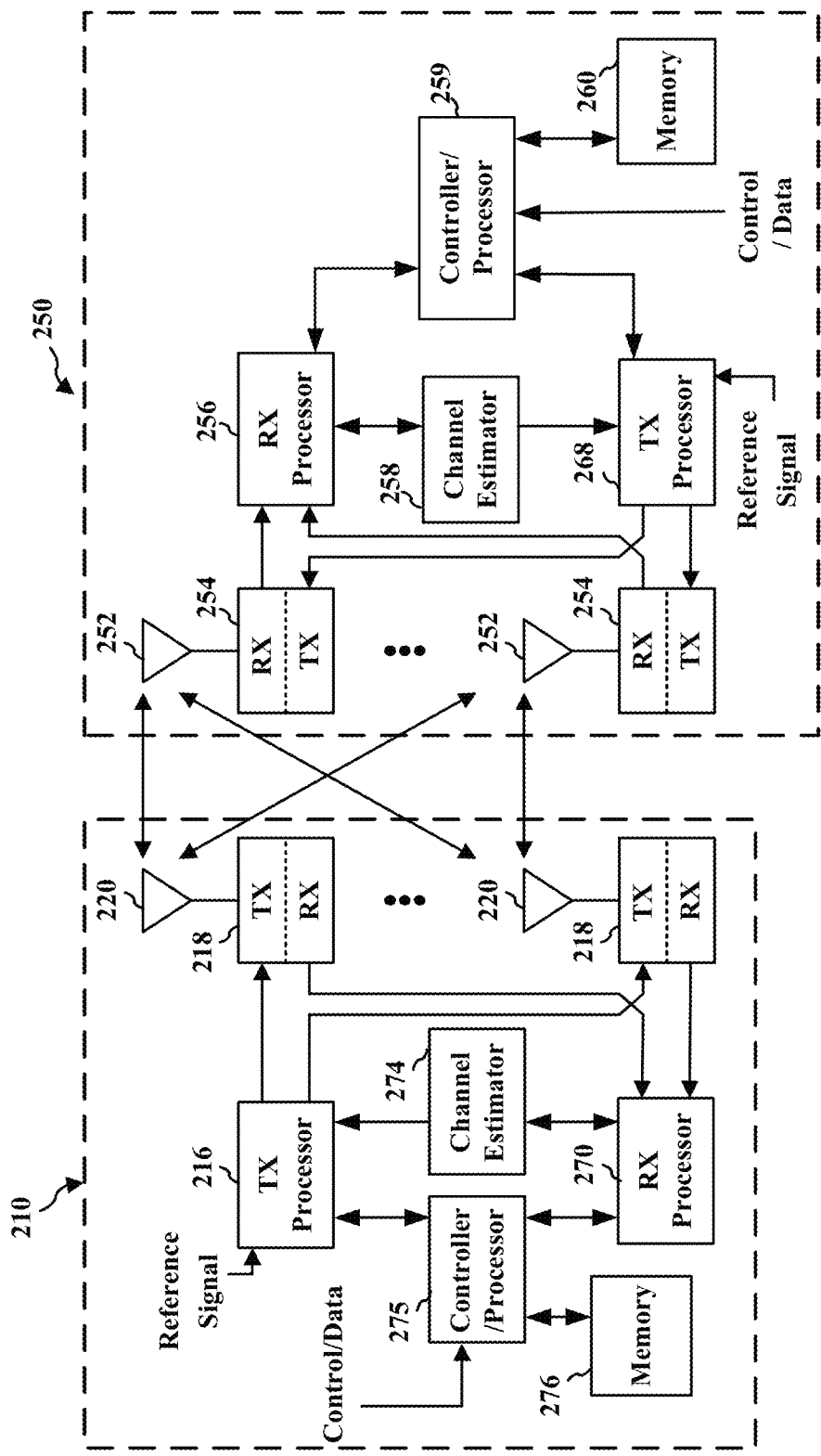
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
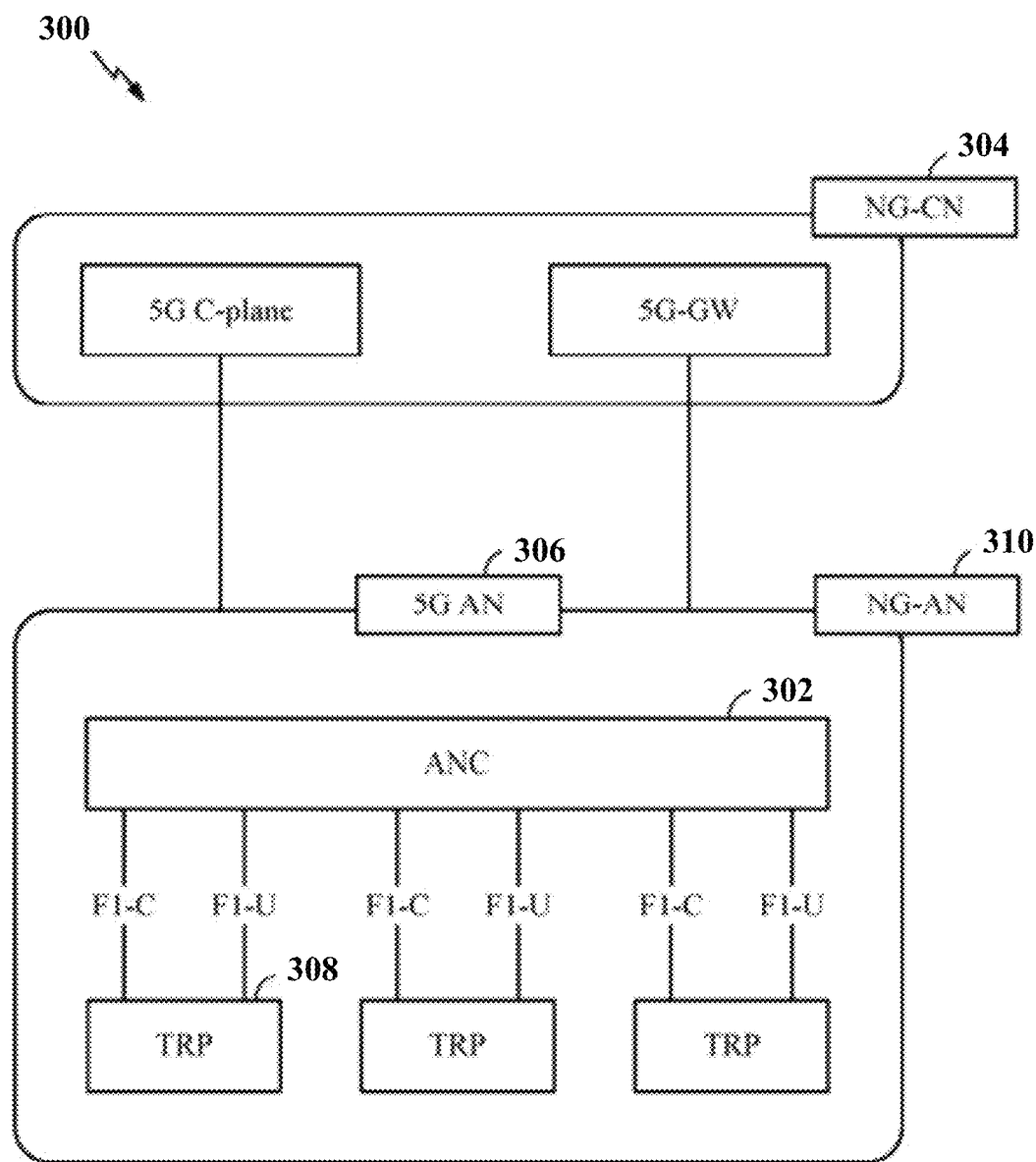
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
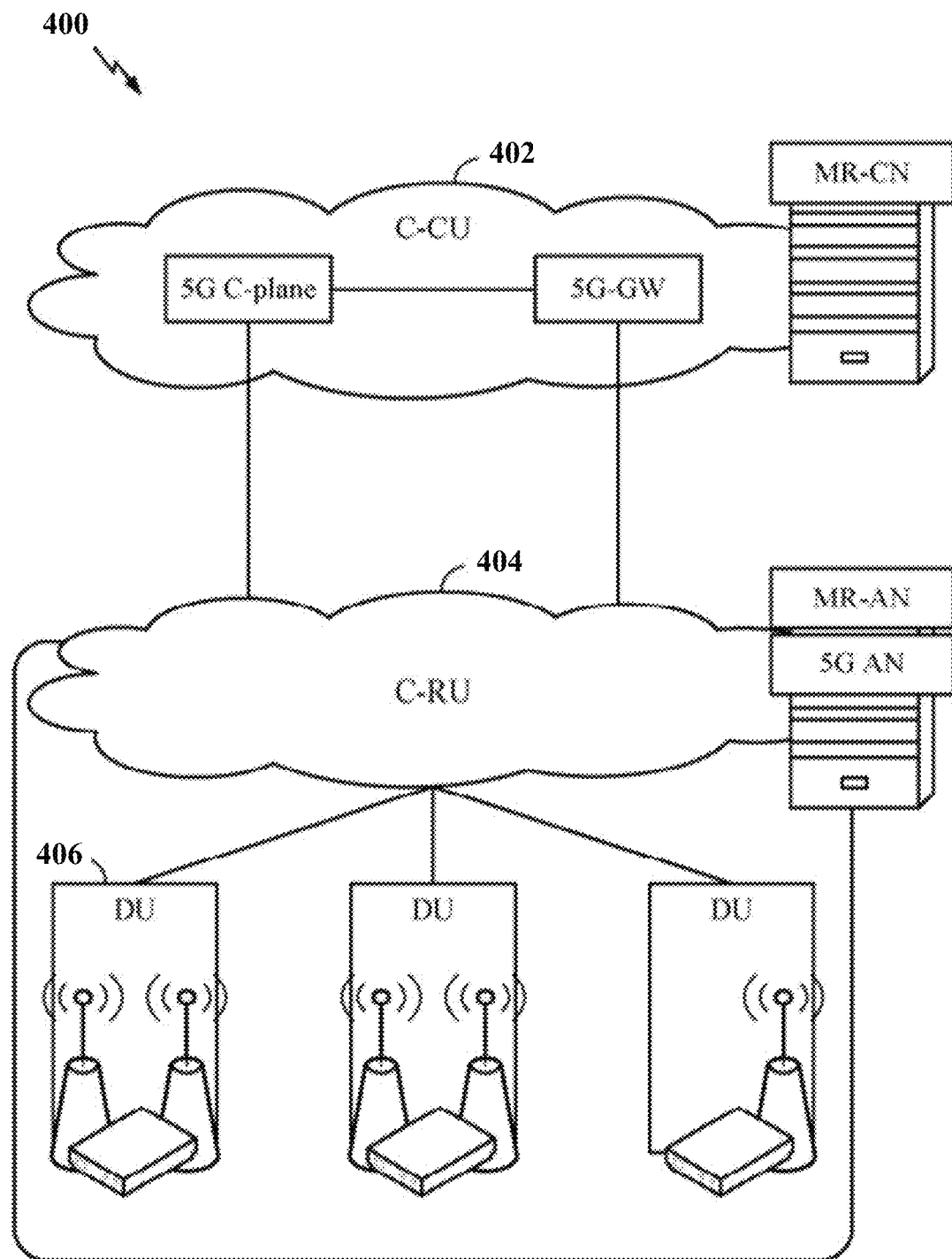
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
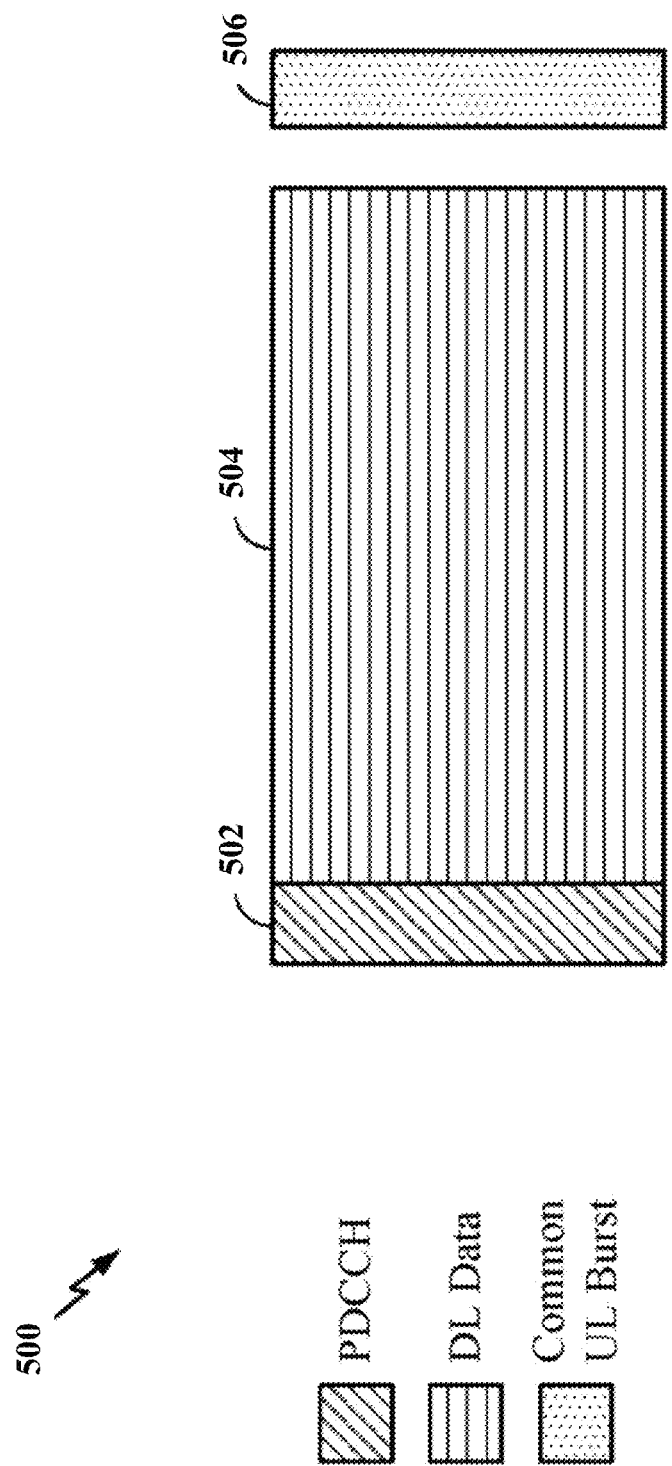
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
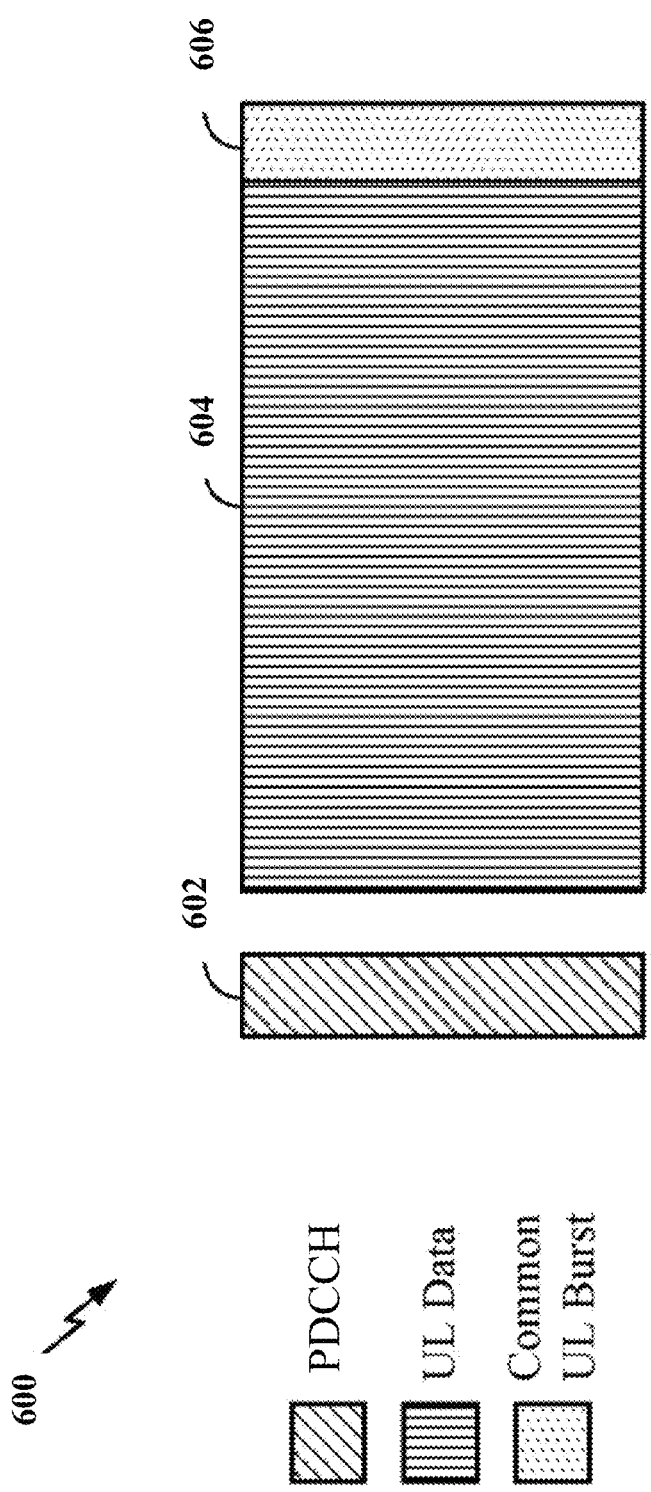
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
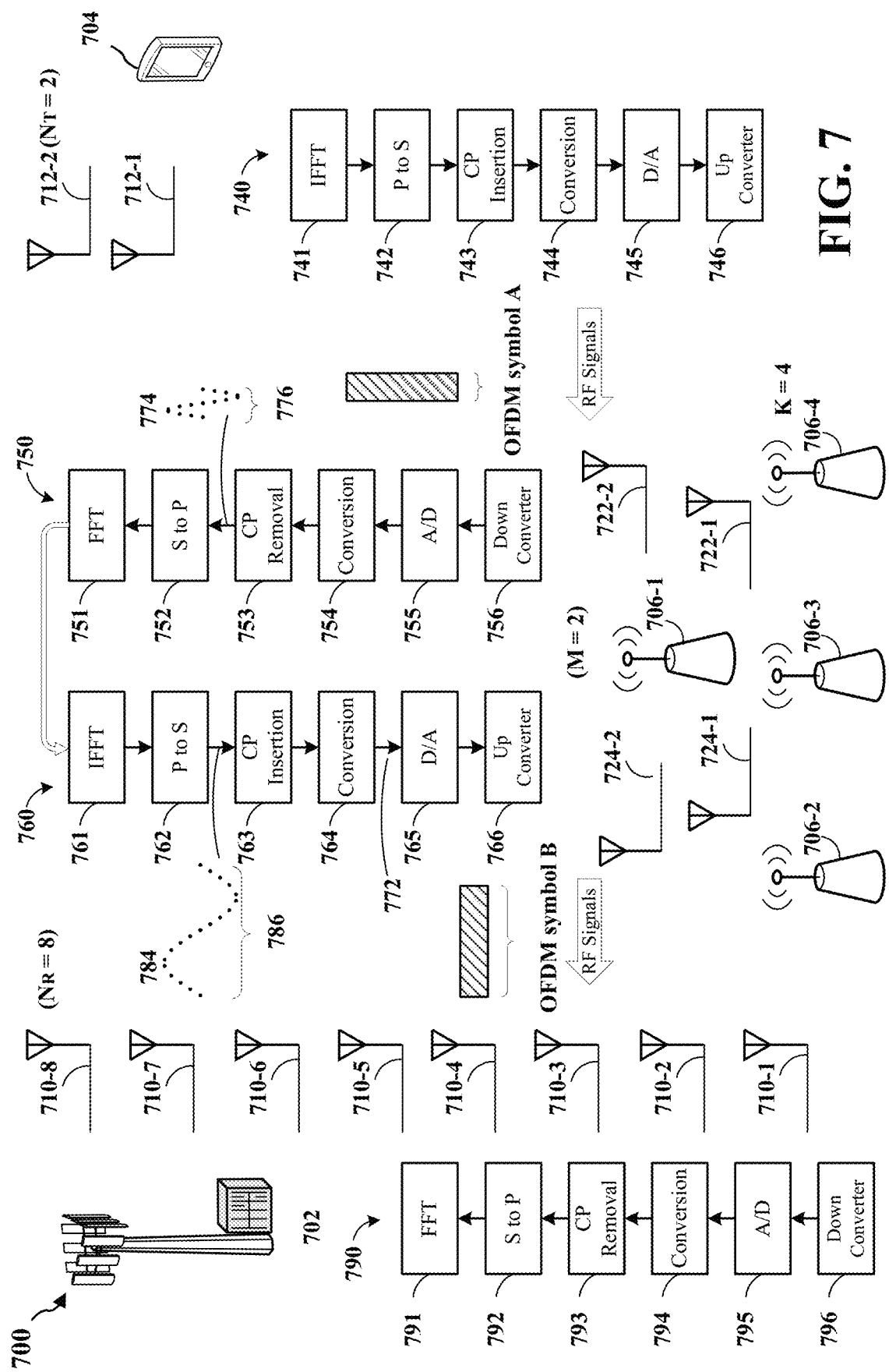
FIG. 7 is a diagram illustrating uplink MIMO transmission from a UE to a base station via one or more repeaters.

FIG. 7 is a diagram 700 illustrating uplink MIMO transmission from a UE to a base station via one or more repeaters. In this example, a UE 704 has 2 transmission antennas 712-1, 712-2 and a base station 702 has 8 antennas 710-1, 710-2, . . . 710-8. Further, repeaters 706-1 . . . 706-K are placed between the base station 702 and the UE 704. In this example, K is 4. Each of the repeaters 706-1 . . . 706-K has two reception antennas 722-1, 722-2 and two transmission antennas 724-1, 724-2. In certain configurations, the same antenna may function as a reception antenna and a transmission antenna.

The UE 704 utilizes a respective transmission chain 740 to generate RF signals to be transmitted at transmission antennas 712-1, 712-2. Each transmission chain 740 includes an IFFT component 741, a parallel to serial component 742, a CP insertion component 743, a conversion component 744 that includes a rate converter and/or filter(s), a digital-to-analog converter 745, and an up converter 746.

Figure 8:
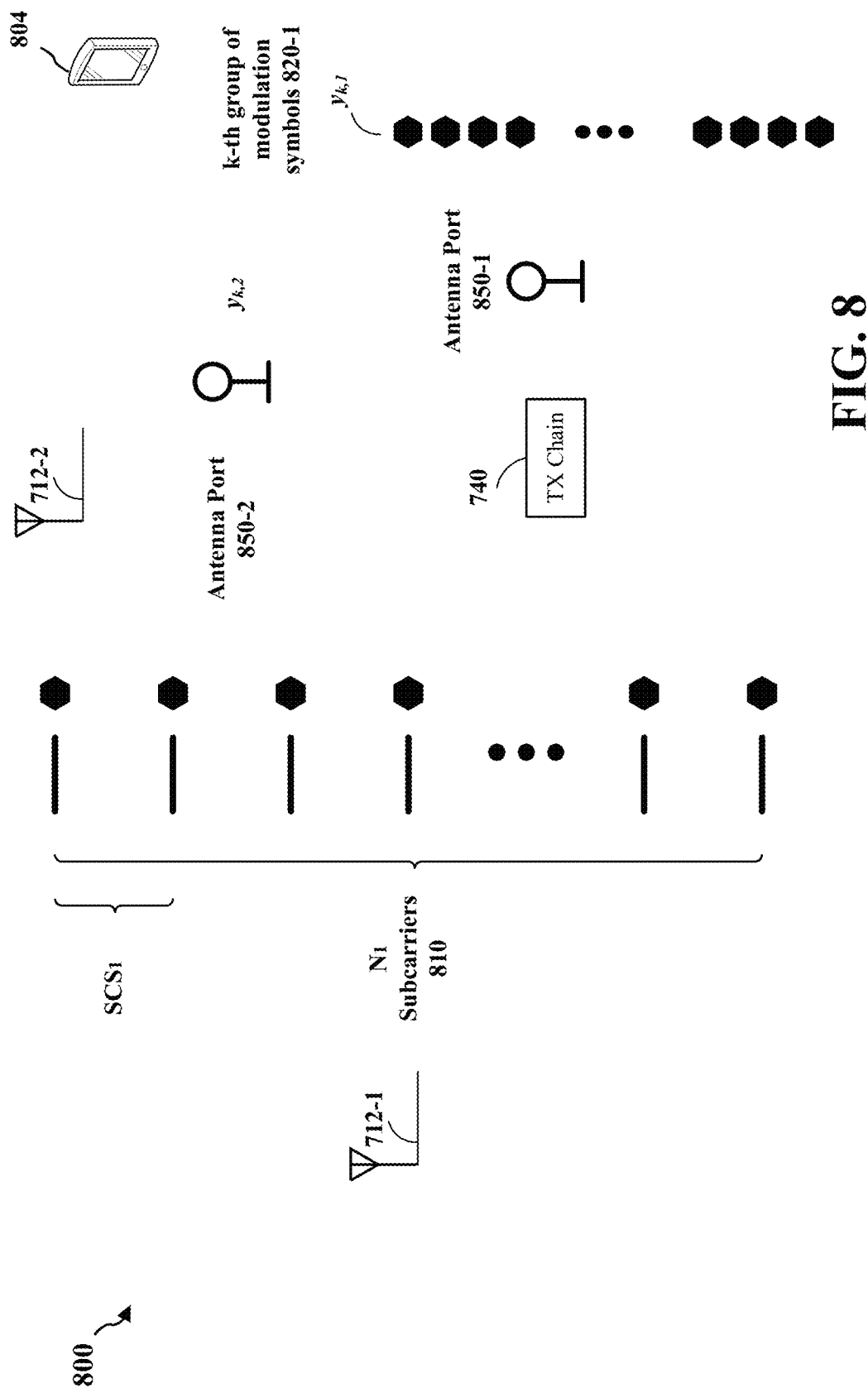
FIG. 8 is a diagram illustrating RF signal generation at a UE.

FIG. 8 is a diagram 800 illustrating RF signal generation at a UE. In this example, the UE 704 may be configured with 2 antenna ports 850-1, 850-2 to each of which one or more of the antennas 712-1, 712-2 are assigned. In particular, each of the antenna ports 850-1, 850-2 may be associated with more than one physical antenna. In such a case, each of the antenna port may be referred to as a beamformed antenna port.

Further, each transmission chain 740 may use $N_1$ subcarriers 810 (e.g., 4096 subcarriers) having a $SCS_1$ (e.g., 120 kHz). The transmission chain 740 of the transmission antenna 712-$i$ receives, from an $i^{th}$ antenna port, a $k^{th}$ group of $N_1$ modulation symbols 820-$i$, denoted as $y_{k,i}$, and generates corresponding RF signals to be transmitted through the transmission antenna 712-$i$ in an OFDM symbol A, which corresponds to $SCS_1$. k is the group index of the modulation symbols and i is the index of the antenna port.

Using the transmission antenna 712-1 as an example, that antenna is assigned to the antenna port 850-1. A $k^{th}$ group of $N_1$ modulation symbols 820-1 from the antenna port 850-1, $y_{k,1}$, are to be transmitted in one OFDM symbol A through the transmission chain 740. The UE 704 applies $y_{k,1}$ to the $N_1$ subcarriers 810 in a corresponding time period.

Referring back to FIG. 7, the $N_1$ subcarriers 810 carrying the $N_1$ modulation symbols 820-1 are sent to the IFFT component 741 with $N_1$ inputs. The $N_1$ time domain signals output from the IFFT component 741 are treated as a time sequence and sent to the parallel to serial component 742 to form a combined time domain signal. The CP insertion component 743 receives the combined time domain signal and adds a cyclic prefix, resulting a time domain signal spanning an OFDM symbol. The cyclic prefix may eliminate inter-symbol interference between two adjacent OFDM symbols. The resulting time domain signal is in digital form, and processed through the conversion component 744 to achieve a desired sample rate. The converted time domain signal in digital form is sent to the digital-to-analog converter 745, which accordingly generates an analog time domain signal. Subsequently, the up converter 746 receives the analog time domain signal and mixes the analog time domain signal with a first carrier frequency ($f_1$) to generate a RF signal. The RF signal is transmitted through the antenna 712-1 of the UE 704. In particular, the first carrier frequency of the RF signals transmitted from the UE 704 may be in FR2.

Similarly, the antenna ports 850-2 receives modulation symbols. A transmission chain 740 assigned to the antenna ports 850-2 accordingly generates corresponding RF signals, which are transmitted through an antenna assigned to the antenna ports 850-2. As such, in this example, $y_{k,1}$ and $y_{k,2}$ are transmitted through the transmission antennas 712-1 and 712-2.

Figure 9:
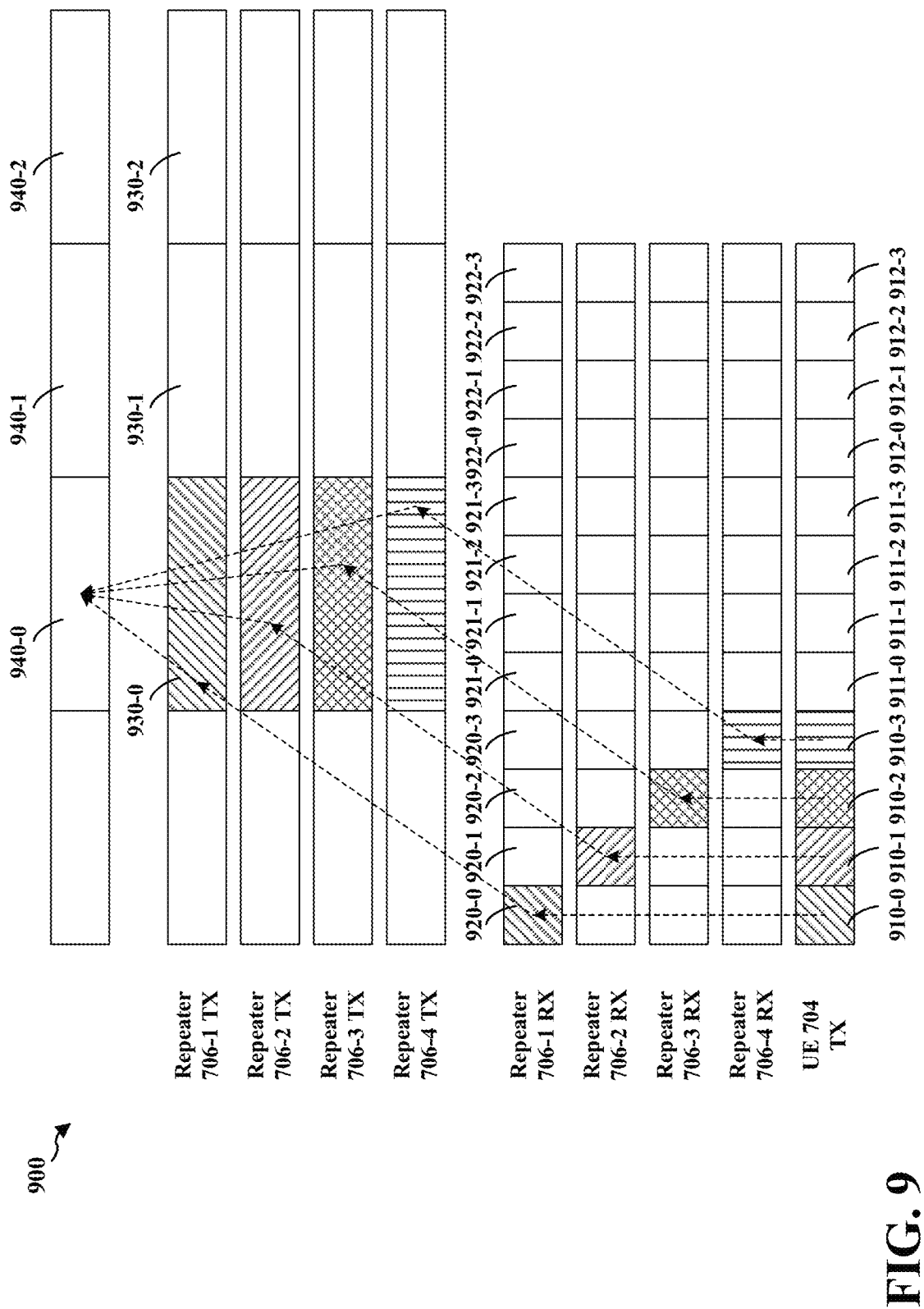
FIG. 9 is a diagram illustrating uplink transmission timing from a UE to a base station via one or more repeaters.

FIG. 9 is a diagram 900 illustrating uplink transmission timing from a UE to a base station via one or more repeaters. The UE 704 transmits, through the transmission antennas 712-1 and 712-2, RF signals on a first carrier frequency in slots 910-0, . . . , 910-$q$, slots 911-0, . . . , 911-$q$, and slots 912-0, . . . , 912-$q$, etc. The slots 910-0, . . . , 910-$q$, etc. are corresponding to a first subcarrier spacing ($SCS_1$, e.g., 120 kHz).

As described infra, the slots 920-0, . . . , 920-$q$, slots 921-0, . . . , 921-$q$, and slots 922-0, . . . , 922-$q$, etc. are corresponding to the first subcarrier spacing ($SCS_1$). The repeaters 706-1 . . . 706-K receive the RF signals of the first carrier frequency in the slots 920-0, . . . , 920-$q$, slots 921-0, . . . , 921-$q$, and slots 922-0, . . . , 922-$q$, etc. The repeaters 706-1 . . . 706-K transform a first set of baseband signals carried on the RF signals of the first carrier frequency to obtain a second set of baseband signals, and transmit the second set of baseband signals over RF signals of a second carrier frequency in slots 930-0, 930-1, 930-2, etc. As described infra, the slots 930-0, 930-1, 930-2, etc. are corresponding to a second subcarrier spacing ($SCS_2$, e.g., 30 kHz). The base station 702 receives the RF signals of the second carrier frequency in slots 940-0, 940-1, 940-2, etc. The slots 940-0, 940-1, 940-2, etc. are corresponding to the second subcarrier spacing ($SCS_2$). In this example, q is 3. In NR, a slot may be an interval occupied by 14 OFDM symbols. The repeaters receive signal at the first frequency in the high frequency band, which may not be able to be used for direct transmission to the base station due to limited coverage. After repeater operations, the signal is forwarded by the repeaters at the second frequency in the low frequency band, which provides much wider coverage for the base station. As a result, we can trade the un-used/out-of-coverage bandwidth in the high frequency band for additional spatial multiplexing gain in the low frequency band.

The time duration of each of the slots 920-0, . . . , 920-$q$, etc. is $TTI_1$. The time duration of each of the slots 930-0, 930-1, 930-2, etc. is $TTI_2$. Denote $L=SCS_1/SCS_2=TTI_2/TTI_1$. Denote the first carrier frequency as $f_1$, and the second carrier frequency as $f_2$.

The UE 704 transmits the RF signals on $f_1$ to the $k^{th}$ repeater at $t_0 \times TTI_2 + (k-1) \times TTI_1$ (k=1, . . . , K) (e.g., slots 910-0, . . . , 910-$q$), $t_0$ is the time index defined according to $TTI_2$. In this example, the UE 704 transmits the RF signals to the repeater 706-1 in slot 910-0, to the repeater 706-2 in slot 910-1, to the repeater 706-3 in slot 910-2 and to the repeater 706-4 in slot 910-3.

Each of the repeaters 706-1 . . . 706-K receives and transmits respective RF signals of $f_1$ as described infra. The $k^{th}$ repeater receives its RF signals of $f_1$ in $t_0 \times TTI_2 + (k-1) \times TTI_1$ (k=1, . . . , K) and transmits the RF signals of $f_2$ in $(t_0 + \text{offset}) \times TTI_2$. The offset (e.g., 1) is set to provide sufficient time for signal receiving and processing at a repeater. The number of repeaters 706-1 . . . 706-K (i.e., K) is at most L where is $SCS_1/SCS_2=TTI_2/TTI_1$, to utilize the full timing resource for transmission. In this example, the repeater 706-1 receives the RF signals in slots 920-0 and waits 3 slots (i.e., 920-1, 920-2, 920-3), the repeater 706-2 receives the RF signals in slots 920-1 and waits 2 slots (i.e., 920-2, 920-3), the repeater 706-3 receives the RF signals in slots 920-2 and waits 1 slot (i.e., 920-3), the repeater 706-4 receives the RF signals in slots 920-3. The repeaters 706-1, 706-2, 706-3 and 706-4 transmit their own RF signals to the base station 702 simultaneously in the next $TTI_2$ slot 930-0.

Referring back to FIG. 7, as described supra, there are K repeaters 706-1 . . . 706-K placed between the base station 702 and the UE 704. In general, a repeater has $M_r$ reception antennas and $M_t$ transmission antennas. In this example, for ease of presentation, $M_t=M_r=M$. A single physical antenna may function as both a reception antenna and a transmission antenna. More specifically, M is 2. Each of the repeaters 706-1 . . . 706-K has reception antennas 722-1, 722-2 and transmission antennas 724-1, 724-2.

Each of the repeaters 706-1 . . . 706-K receives RF signals transmitted from the UE 704. For example, each of the reception antennas 722-1, 722-2 of the repeater 706-1 may receive RF signals transmitted from the antennas 712-1, 712-2 of the UE 704. A respective reception chain 750 processes RF signals received through each of the reception antennas 722-1, 722-2. The reception chain 750 includes a down converter 756, an analog-to-digital converter 755, a conversion component 754 that includes a rate converter and/or filter(s), a CP removal component 753, a serial to parallel component 752, an FFT component 751.

Using the reception antenna 722-1 as an example, the corresponding down converter 756 processes the RF signals received through that antenna to obtain corresponding analog baseband signals, for example, through frequency down-conversion. The analog-to-digital converter 755 converts the analog baseband signals to digital samples. In particular, to generate the channel signal samples from a baseband waveform, the baseband waveform may be sampled at a rate higher than its Nyquist sampling rate by the analog-to-digital converter 755.

The digital samples are then passed through the conversion component 754, which contains one or more digital filters. The digital filters may perform various functions including I-Q imbalance compensation, carrier synchronization, and/or timing synchronization, etc. to eliminate some imperfections in hardware.

Figure 10:
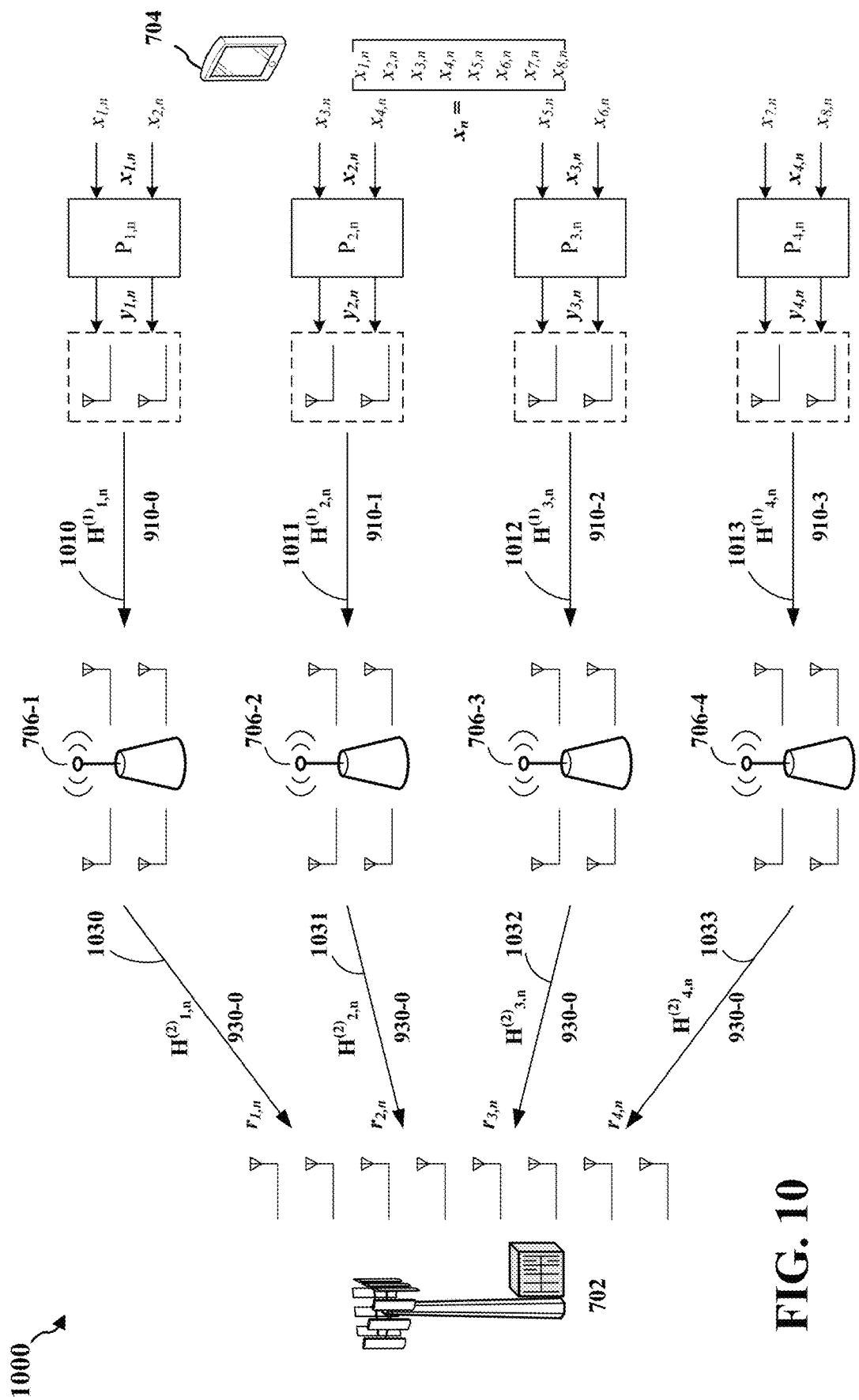
FIG. 10 is a diagram illustrating uplink transmission according to a non-coherent joint transmission (NCJT) approach.

FIG. 10 is a diagram 1000 illustrating uplink transmission according to a non-coherent joint transmission (NCJT) approach. Non-coherent transmission here means that coherent transmission of a transmission antenna across multiple $TTI_1$ intervals is not guaranteed. In this example, the base station 702 have 8 antennas corresponding 8 reception antenna ports and the UE 704 has 2 antennas corresponding 2 reception antenna ports. The repeaters 706-1, . . . , 706-K are placed between the base station 702 and the UE 704.

In the NCJT configuration, the UE 704 transmits multiple layers of baseband signals across multiple $TTI_1$ intervals (i.e., slots 920-0, . . . , 920-3) corresponding to one $TTI_2$ interval (i.e., slot 930-0) to the base station 702 through the repeaters 706-1, . . . , 706-K. In each of the multiple $TTI_1$ intervals, the UE 704 transmits some, but not all, of the multiple layers of baseband signals. The $TTI_2$ interval is subsequent to the corresponding $TTI_1$ intervals.

In this example, the UE 704 generates 8 layers baseband data signals $x_{1,n}, x_{2,n}, \ldots, x_{8,n}$ (or modulation symbols) on a subcarrier n, which can be represented by a vector:

$$x_{n_{8\times1}} = \begin{bmatrix} x_{1,n} \\ x_{2,n} \\ \vdots \\ x_{8,n} \end{bmatrix}.$$

The UE 704 divides the symbols $x_{n_{8\times1}}$ into 4 layer groups $x_{1_{2\times1}}, x_{2_{2\times1}}, x_{3_{2\times1}}$ and $x_{4_{2\times1}}$, each corresponding to one of the 4 $TTI_1$ intervals:

$$x_{1,n_{2\times1}} = \begin{bmatrix} x_{1,n} \\ x_{2,n} \end{bmatrix}; x_{2,n_{2\times1}} = \begin{bmatrix} x_{3,n} \\ x_{4,n} \end{bmatrix}; x_{3,n_{2\times1}} = \begin{bmatrix} x_{5,n} \\ x_{6,n} \end{bmatrix}; x_{4,n_{2\times1}} = \begin{bmatrix} x_{7,n} \\ x_{8,n} \end{bmatrix}.$$

During one $TTI_1$ interval, the UE 704 transmits baseband signals of one of the 4 layer groups, using a precoder to map the baseband signals of the corresponding layer group to the antennas of the UE 704. In each $TTI_1$ interval, the UE transmits signals by two antennas. Considering the 4 $TTI_1$ intervals together, the UE appears to be transmitting signals by 8 effective antennas, and the corresponding 8-by-1 precoder to be applied on the 8 effective antennas for each layer contains at most two non-zero elements corresponding to one of the four $TTI_1$ intervals. Note the 8-by-1 precoder can be equivalently expressed by four 2-by-1 precoders separately used in the 4 TTIs. This process ensures that the baseband signals are transmitted efficiently and effectively to the base station 702 through the repeaters 706-1 . . . 706-K.

In this example, more specifically, the UE 704 uses a precoder $P_{1,n_{2\times 2}}$ to map the baseband data signals $x_{1,n_{2\times 1}}$ on the subcarrier n to the 2 transmission antennas to generate 2 baseband signals $y_{1,n_{2\times 1}}$ in the slot 910-0, which can be represented as $y_{1,n_{2\times 1}} = P_{1,n_{2\times 2}} \cdot x_{1,n_{2\times 1}}$. Further, the UE 704 mixes $y_{1,n_{2\times 1}}$ with RF carriers of $f_1$ to generate 2 RF signals and transmits the RF signals to the repeater 706-1 in slot 910-0 through a channel 1010 which can be represented as $H_{1,n_{2\times 2}}^{(1)}$.

The repeater 706-1 receives, in the slot 920-0, the RF signals transmitted from the UE 704. The impact, of the rate conversion and frequency translation (RCFT) process, to the base band signals can be represented as $T_1$. The repeater 706-1 further transmits the RF signals of $f_2$, generated through the RCFT process, to the base station 702 in the slot 930-0 through a channel 1030 which can be represented as $H_{1,n_{8\times 2}}^{(2)}$. Accordingly, on the subcarrier n, the baseband signals received by the base station 702 from the repeater 706-1 can be represented as $$r_{1,n_8\times 1} = H_{1,n_8\times 2}^{(2)} \cdot T_1 \cdot H_{1,n_2\times 2}^{(1)} \cdot P_{1,n_2\times 2} \cdot x_{1,n_2\times 1} + n_1 =$$

$$H_{1,n_8\times 2}^{(2)} \cdot T_1 \cdot H_{1,n_2\times 2}^{(1)} \cdot y_{1,n_2\times 1} + n_1$$

$n_1$ is equivalent noise vector at the base station 702 which may contain the noise received at the repeater 706-1 and the base station 702.

Similarly, the repeaters 706-2, 706-3, 706-4 receive $y_{2,n_{2\times 1}}$, $y_{3,n_{2\times 1}}$, $y_{4,n_{2\times 1}}$ transmitted from the UE 704 on $f_1$ in the slots 920-1, 920-2, 920-3, respectively. The repeaters 706-2, 706-3, 706-4 process the received RF signals through the RCFT processes and transmit the result RF signals on $f_2$ in the slot 930-0.

The base station 702 receives the RF signals on $f_2$ transmitted from the repeaters 706-1 . . . 706-4 in the slot 940-0. The received baseband signal $r_{n_8\times 1}$ at the base station 702 can be expressed as the sum of all signals received from the repeaters 706-1, . . . , 706-4 as follows:

$$r_{n_8\times 1} = r_{1,n_8\times 1} + r_{2,n_8\times 1} + r_{3,n_8\times 1} + r_{4,n_8\times 1}$$

$$= H_{1,n_8\times 2}^{(2)} \cdot T_1 \cdot H_{1,n_2\times 2}^{(1)} \cdot P_{1,n_2\times 2} \cdot x_{1,n_2\times 1} + n_1$$

$$= + H_{2,n_8\times 2}^{(2)} \cdot T_2 \cdot H_{2,n_2\times 2}^{(1)} \cdot P_{2,n_2\times 2} \cdot x_{2,n_2\times 1} + n_2$$

$$= + H_{3,n_8\times 2}^{(2)} \cdot T_3 \cdot H_{3,n_2\times 2}^{(1)} \cdot P_{3,n_2\times 2} \cdot x_{3,n_2\times 1} + n_3$$

$$= + H_{4,n_8\times 2}^{(2)} \cdot T_4 \cdot H_{4,n_2\times 2}^{(1)} \cdot P_{4,n_2\times 2} \cdot x_{4,n_2\times 1} + n_4$$

$$= \sum_{l=1}^{4} H_{l,n_8\times 2}^{(2)} \cdot T_l \cdot H_{l,n_2\times 2}^{(1)} \cdot y_{l,n_2\times 1} + n$$

$$= H_{eq,n} \cdot \begin{bmatrix} y_{l,1,n} \\ \ldots \\ y_{l,8,n} \end{bmatrix} + n$$

$H_{eq,n}$ is an equivalent channel matrix for the n-th subcarrier at the base station 702, which is given by $$H_{eq,n} = [H_{1,n}^{(2)} \cdot T_1 \cdot H_{1,n}^{(1)}, \ldots, H_{4,n}^{(2)} \cdot T_4 \cdot H_{4,n}^{(1)}].$$

The base station 702 can decode the received baseband signal $r_{n_8\times 1}$ based on the equivalent channel matrix $H_{eq,n}$ and the precoding matrices $P_{1,n}$, $P_{2,n}$, $P_{3,n}$, and $P_{4,n}$. By doing so, the base station 702 can recover the transmitted baseband data signals $x_{1,n}, \ldots x_{4,n}$ (i.e., $x_{1,n}, x_{2,n}, \ldots, x_{8,n}$) and maintain the desired data transmission rate effectively.

Generally, the UE 704 has $N_T$ transmission antennas, the base station 702 has $N_R$ reception antennas and the L repeaters 706-1, . . . , 706-L with $M_T$ transmission antennas and M R reception antennas where $M_T = M_R = M$ are located between the UE 704 and the base station 702. The UE 704 may generate R layers baseband data signals. The UE 704 divides the R layers baseband data signals into L groups and each group has $R_l$ layers. The received baseband signal $r_n \in \mathbb{C}^{N_R \times 1}$ at the n-th subcarrier at the base station 702 is the sum of signal transmitted from L repeaters 706-1, . . . , 706-L and it can be expressed as below Equation (A):

$$r_n = \sum_{l=1}^{L} H_{l,n}^{(2)} T_{l,n} H_{l,n}^{(1)} \cdot P_{l,n} \cdot x_{l,n} + n_n = \sum_{l=1}^{L} H_{l,n}^{(2)} T_{l,n} H_{l,n}^{(1)} \cdot \begin{bmatrix} y_{l,1,n} \\ \ldots \\ y_{l,N_T,n} \end{bmatrix} + n_n$$

where $H_{l,n}^{(2)} \in \mathbb{C}^{N_R \times M}$ denotes the channel matrix in the second hop from the l-th repeater 706-1 to the base station 702, $H_{l,n}^{(1)} \in \mathbb{C}^{M \times N_T}$ denotes the channel matrix in the first hop from the UE 704 to the l-th repeater 706-1, $T_{l,n} \in \mathbb{C}^{M \times M}$ is an amplifying matrix describing the mapping from the repeater input to the repeater output, $n_n$ is the equivalent noise vector at the base station 702 which may contain the noise received at the repeaters 706-1, . . . , 706-L and the base station 702, $x_{l,n} \in \mathbb{C}^{R_l \times 1}$ denote the rank-$R_l$ signal transmitted by the UE over the l-th $TTI_1$ interval, $P_{l,n} \in \mathbb{C}^{N_T \times R_l}$ represent the precoding matrix of $x_{l,n}$ for the l-th spatial transmitting setting and $y_{l,i,n}$ denotes the frequency-domain baseband signal at the n-th subcarrier for the i-th Tx antenna. In a period of L $TTI_1$ intervals, the UE 704 may be considered as having $L \cdot N_T$ effective antennas; however, not all of the effective antennas are guaranteed for supporting coherent transmission of a spatial layer in the NCJT configuration. Since number of data layers can be transmitted is limited by number of Tx antennas of the UE, the UE 704 can transmit at most $N_T$ spatial layers in one $TTI_1$ interval. Hence, the total number of spatial layers in one $TTI_2$ interval is $R = \sum_{l=1}^{L} R_l$, where $R_l \leq N_T$ for l=1, . . . , L.

Based on the equation, the base station 702 can determine R layers baseband data signals $x_{1,n}, x_{2,n}, \ldots, x_{R,n}$ at the n-th subcarrier. In this example, $N_R = 8$, $N_T = 2$, $M_R = M_T = M = 2$, R=8, L=4 and $R_l = 2$ for l=1, . . . , L.

Figure 11:
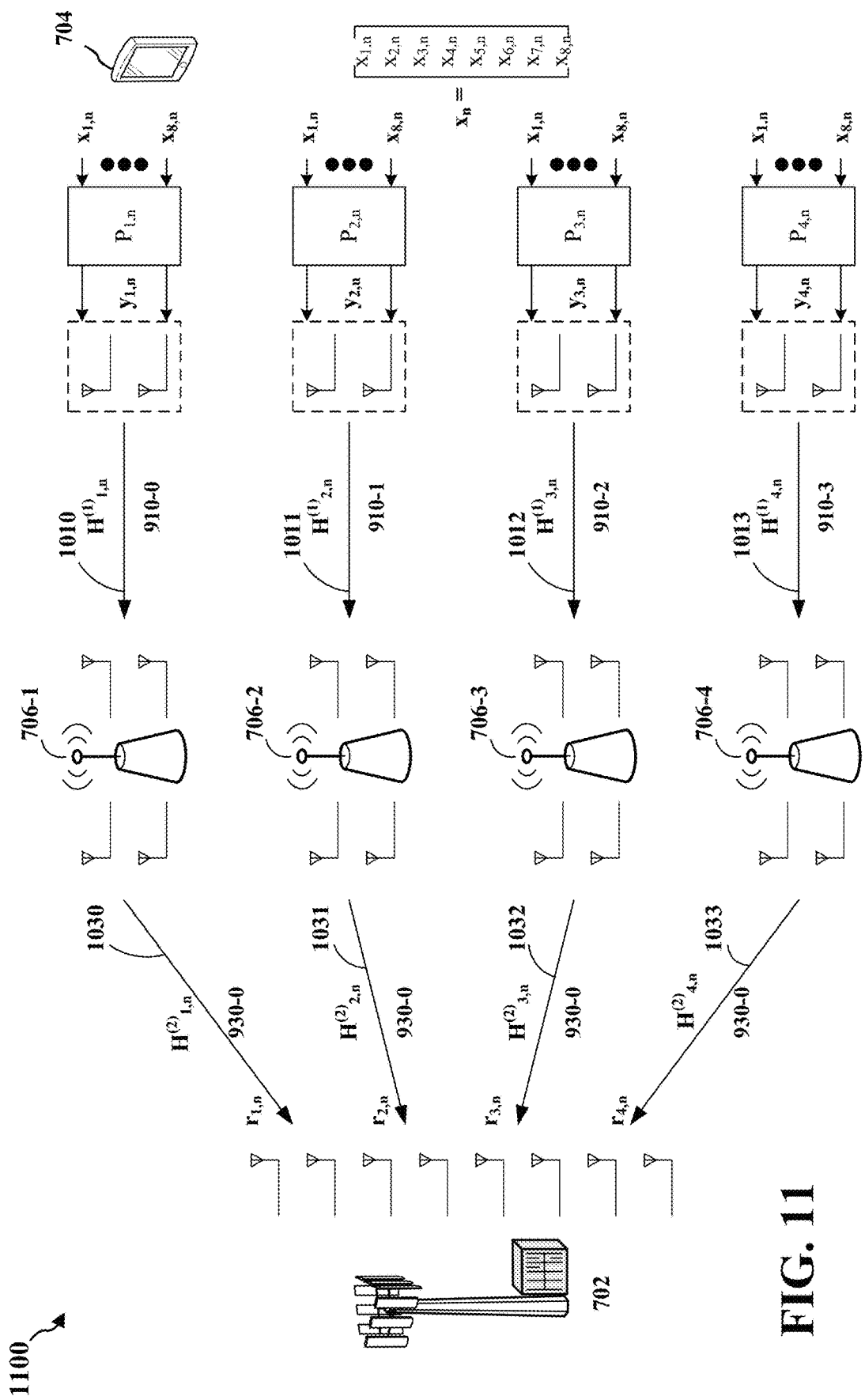
FIG. 11 is a diagram illustrating uplink transmission according to a coherent joint transmission (CJT) approach.

FIG. 11 is a diagram 1100 illustrating uplink transmission according to a coherent joint transmission (CJT) approach. Coherent transmission here means that coherent transmission of a transmission antenna across multiple $TTI_1$ intervals is guaranteed. In this example, the base station 702 have 8 antennas corresponding 8 reception antenna ports and the UE 704 has 2 antennas corresponding 2 transmission antenna ports. The repeaters 706-1, . . . , 706-K are placed between the base station 702 and the UE 704.

In the CJT configuration, the UE 704 transmits all of the multiple layers of baseband signals across each of multiple $TTI_1$ intervals (i.e., slots 920-0, . . . , 920-3) corresponding to one $TTI_2$ interval (i.e., slot 930-0) to the base station 702 through the repeaters 706-1, . . . , 706-K. The $TTI_2$ interval is subsequent to the corresponding $TTI_1$ intervals. In each $TTI_1$ interval, the UE 704 transmits signals by two antennas. Considering the 4 $TTI_1$ intervals together, the UE 704 appears to be transmitting signals by 8 effective antennas. For the CJT configuration, the UE 704 should ensure coherent transmissions across the 4 $TTI_1$ intervals. In other words, one layer of baseband data signal can be coherently (or partially coherent) transmitted by the 8 effective transmission antennas.

In this example, the UE 704 generates 8 layers baseband data signals $x_{1,n}, x_{2,n}, \ldots, x_{8,n}$ (or modulation symbols) on a subcarrier n, which can be represented by a vector:

$$x_{n_8 \times 1} = \begin{bmatrix} x_{1,n} \\ x_{2,n} \\ \vdots \\ x_{8,n} \end{bmatrix}.$$

During one $TTI_1$ interval, the UE 704 transmits baseband signals of $x_{n_8 \times 1}$, using a precoder to map the baseband signals of the corresponding layer group to the antennas of the UE 704. This process ensures that the baseband signals are transmitted efficiently and effectively to the base station 702 through the repeaters 706-1 . . . 706-K.

In this example, more specifically, the UE 704 uses a precoder $P_{1,n_{2 \times 8}}$ to map the baseband data signals $x_{n_8 \times 1}$ on the subcarrier n to the 2 transmission antennas to generate 2 baseband signals $y_{1,n_{2 \times 1}}$ in the slot 910-0, which can be represented as $y_{1,n_{2 \times 1}} = P_{1,n_{2 \times 8}} \cdot x_{n_8 \times 1}$. Further, the UE 704 mixes $y_{1,n_{2 \times 1}}$ with RF carriers of $f_1$ to generate 2 RF signals and transmits the RF signals to the repeater 706-1 in slot 910-0 through the channel 1010 which can be represented as $H_{1,n_{2 \times 2}}^{(1)}$.

The repeater 706-1 receives, in the slot 920-0, the RF signals transmitted from the UE 704. The impact, of the rate conversion and frequency translation (RCFT) process, to the base band signals can be represented as $T_1$. The repeater 706-1 further transmits the RF signals of $f_2$, generated through the RCFT process, to the base station 702 in the slot 930-0 through the channel 1030 which can be represented as $H_{1,n_{8 \times 2}}^{(2)}$. Accordingly, on the subcarrier n, the baseband signals received by the base station 702 from the repeater 706-1 can be represented as $$r_{1,n_8 \times 1} = H_{1,n_8 \times 2}^{(2)} \cdot T_1 \cdot H_{1,n_2 \times 2}^{(1)} \cdot P_{1,n_2 \times 2} \cdot x_{1,n_2 \times 1} + n_1 =$$

$$H_{1,n_8 \times 2}^{(2)} \cdot T_1 \cdot H_{1,n_2 \times 2}^{(1)} \cdot y_{1,n_2 \times 1} + n_1$$

$n_1$ is equivalent noise vector at the base station 702 which may contain the noise received at the repeater 706-1 and the base station 702.

Similarly, the repeaters 706-2, 706-3, 706-4 receive $y_{2,n_{2 \times 1}}, y_{3,n_{2 \times 1}}, y_{4,n_{2 \times 1}}$ transmitted from the UE 704 on $f_1$ in the slots 920-1, 920-2, 920-3, respectively. The repeaters 706-2, 706-3, 706-4 process the received RF signals through the RCFT processes and transmit the result RF signals on $f_2$ in the slot 930-0.

The base station 702 receives the RF signals on $f_2$ transmitted from the repeaters 706-1 . . . 706-4 in the slot 940-0. The received baseband signal $r_{n_8 \times 1}$ at the base station 702 can be expressed as the sum of all signals received from the repeaters 706-1, . . . , 706-4 as follows:

$$r_{n_8 \times 1} =$$

$$r_{1,n_8 \times 1} + r_{2,n_8 \times 1} + r_{3,n_8 \times 1} + r_{4,n_8 \times 1} = H_{1,n_8 \times 2}^{(2)} \cdot T_1 \cdot H_{1,n_2 \times 2}^{(1)} \cdot P_{1,n_2 \times 8} \cdot x_{n_8 \times 1} +$$

$$n_1 + H_{2,n_8 \times 2}^{(2)} \cdot T_2 \cdot H_{2,n_2 \times 2}^{(1)} \cdot P_{2,n_2 \times 8} \cdot x_{n_8 \times 1} + n_2 + H_{3,n_8 \times 2}^{(2)} \cdot T_3 \cdot$$

-continued $$H_{3,n_2 \times 2}^{(1)} \cdot P_{3,n_2 \times 8} \cdot x_{n_8 \times 1} + n_3 + H_{4,n_8 \times 2}^{(2)} \cdot T_4 \cdot H_{4,n_2 \times 2}^{(1)} \cdot P_{4,n_2 \times 8} \cdot x_{n_8 \times 1} +$$

$$n_4 = \begin{bmatrix} H_{1,n_8 \times 2}^{(2)} \cdot T_1 \cdot H_{1,n_2 \times 2}^{(1)} & \ldots & H_{4,n_8 \times 2}^{(2)} \cdot T_4 \cdot H_{4,n_2 \times 2}^{(1)} \end{bmatrix} \cdot \begin{bmatrix} P_{1,n_2 \times 8} \cdot x_{n_8 \times 1} \\ P_{2,n_2 \times 8} \cdot x_{n_8 \times 1} \\ P_{3,n_2 \times 8} \cdot x_{n_8 \times 1} \\ P_{4,n_2 \times 8} \cdot x_{n_8 \times 1} \end{bmatrix} +$$

$$n = \begin{bmatrix} H_{1,n_8 \times 2}^{(2)} \cdot T_1 \cdot H_{1,n_2 \times 2}^{(1)} & \ldots & H_{4,n_8 \times 2}^{(2)} \cdot T_4 \cdot H_{4,n_2 \times 2}^{(1)} \end{bmatrix} \cdot \begin{bmatrix} y_{1,n_2 \times 1} \\ y_{2,n_2 \times 1} \\ y_{3,n_2 \times 1} \\ y_{4,n_2 \times 1} \end{bmatrix} + n =$$

$$H_{eq,n} \cdot y_{n_8 \times 1} + n$$

where the 8-rank matrix $$H_{eq,n} = [H_{1,n_8 \times 2}^{(2)} \cdot T_1 \cdot H_{1,n_2 \times 2}^{(1)} \ldots H_{4,n_8 \times 2}^{(2)} \cdot T_4 \cdot H_{4,n_2 \times 2}^{(1)}].$$

As such, based on the equation $r_{n_8 \times 1} = H_{eq,n} \cdot y_{n_8 \times 1} + n$ and $y_{i,n_{2 \times 1}} = P_{i,n_{2 \times 8}} \cdot x_{n_8 \times 1}$ for i=1, . . . , 4, the base station 702 can determine 8 layers baseband data signals $x_{1,n}, x_{2,n}, \ldots, x_{8,n}$.

Generally, the UE 704 has $N_T$ transmission antennas, the base station 702 has $N_R$ reception antennas and the L repeaters 706-1, . . . , 706-L with $M_T$ transmission antennas and $M_R$ reception antennas where $M_T = M_R = M$ are located between the UE 704 and the base station 702. The UE 704 may generate R layers baseband data signals. The received baseband signal $r_n \in \mathbb{C}^{N_R \times 1}$ at the n-th subcarrier at the base station 702 is the sum of signal transmitted from L repeaters 706-1, . . . , 706-L and it can be expressed as below Equation (B):

$$r_n = \sum_{l=1}^{L} H_{l,n}^{(2)} T_{l,n} H_{l,n}^{(1)} \cdot P_{l,n} \cdot x_n + n_n = \sum_{l=1}^{L} H_{l,n}^{(2)} T_{l,n} H_{l,n}^{(1)} \cdot \begin{bmatrix} y_{l,1,n} \\ \ldots \\ y_{l,N_T,n} \end{bmatrix} + n_n$$

where $H_{l,n}^{(2)} \in \mathbb{C}^{N_R \times M}$ denotes the channel matrix in the second hop from the l-th repeater 706-1 to the base station 702, $H_{l,n}^{(1)} \in \mathbb{C}^{M \times N_T}$ denotes the channel matrix in the first hop from the UE 704 to the l-th repeater 706-1, $T_{l,n} \in \mathbb{C}^{M \times M}$ is an amplifying matrix describing the mapping from the repeater input to the repeater output, $P_{l,n} \in \mathbb{C}^{N_T \times R}$ represents the precoding matrix for the l-th spatial transmitting setting, and $n_n \in \mathbb{C}^{N_R \times 1}$ is the equivalent noise vector at the base station 702 which may contain the noise received at the repeaters 706-1, . . . , 706-L and the base station 702. In a period of L $TTI_1$ intervals, the UE 704 may be considered as having $L \cdot N_T$ effective antennas. In this formulation, the rank-R signal $x_n$ is precoded by $P_{l,n}$ and transmitted by the UE over the l-th $TTI_1$ interval between ($t_0 \times TTI_2 + (l-1) \times TT_1$, $t_0 \times TTI_2 + l \times TTI_1$) for l=1, . . . , L. By stacking the precoding matrix over L $TTI_1$ intervals, we can formulate the equivalent precoding matrix as $P_{eq,n} = [P_{1,n}^T, \ldots, P_{L,n}^T]^T \in \mathbb{C}^{L N_T \times R}$ and the received baseband signal $r_n \in \mathbb{C}^{N_R \times 1}$ can be rewrite as $$r_n = \begin{bmatrix} H_{1,n}^{(2)} \cdot T_{1,n} \cdot H_{1,n}^{(1)} & \ldots & H_{L,n}^{(2)} \cdot H_{L,n}^{(1)} \end{bmatrix}_{N_R \times L N_T} \cdot \begin{bmatrix} P_{1,n} \\ \ldots \\ P_{L,n} \end{bmatrix} \cdot x_n + n_n =$$

$$H_{eq,n} \cdot P_{eq,n} \cdot x_n + n_n$$

where $H_{eq,n} = [H_{1,n}^{(2)} \cdot T_{1,n} \cdot H_{1,n}^{(1)} \ldots H_{L,n}^{(2)} \cdot T_{L,n} \cdot H_{L,n}^{(1)}] \in \mathbb{C}^{N_R \times L N_T}$ is the equivalent channel matrix. The j-th layer data corresponding to the j-th element of $x_n$ is precoded by the j-th column of $P_{eq,n}$. Note each 8-by-1 precoder (i.e., each column vector of $P_{eq,n}$) used for each layer can be expressed by four 2-by-1 precoders separately used in the 4 TTIs.

In both NCJT and CJT approaches above, the precoders used by UE are determined either by base station or by the UE itself, according to channel state information of UL channels. The base station can determine the precoders based on measuring sounding reference signal sent by the UE to obtain channel state information and can indicate the precoders to the UE for UL data transmissions. For the case where the UE determines the precoders, the UE may rely on measuring reference signals sent from the base station and may assume channel reciprocity to obtain channel state information.

Figure 12:
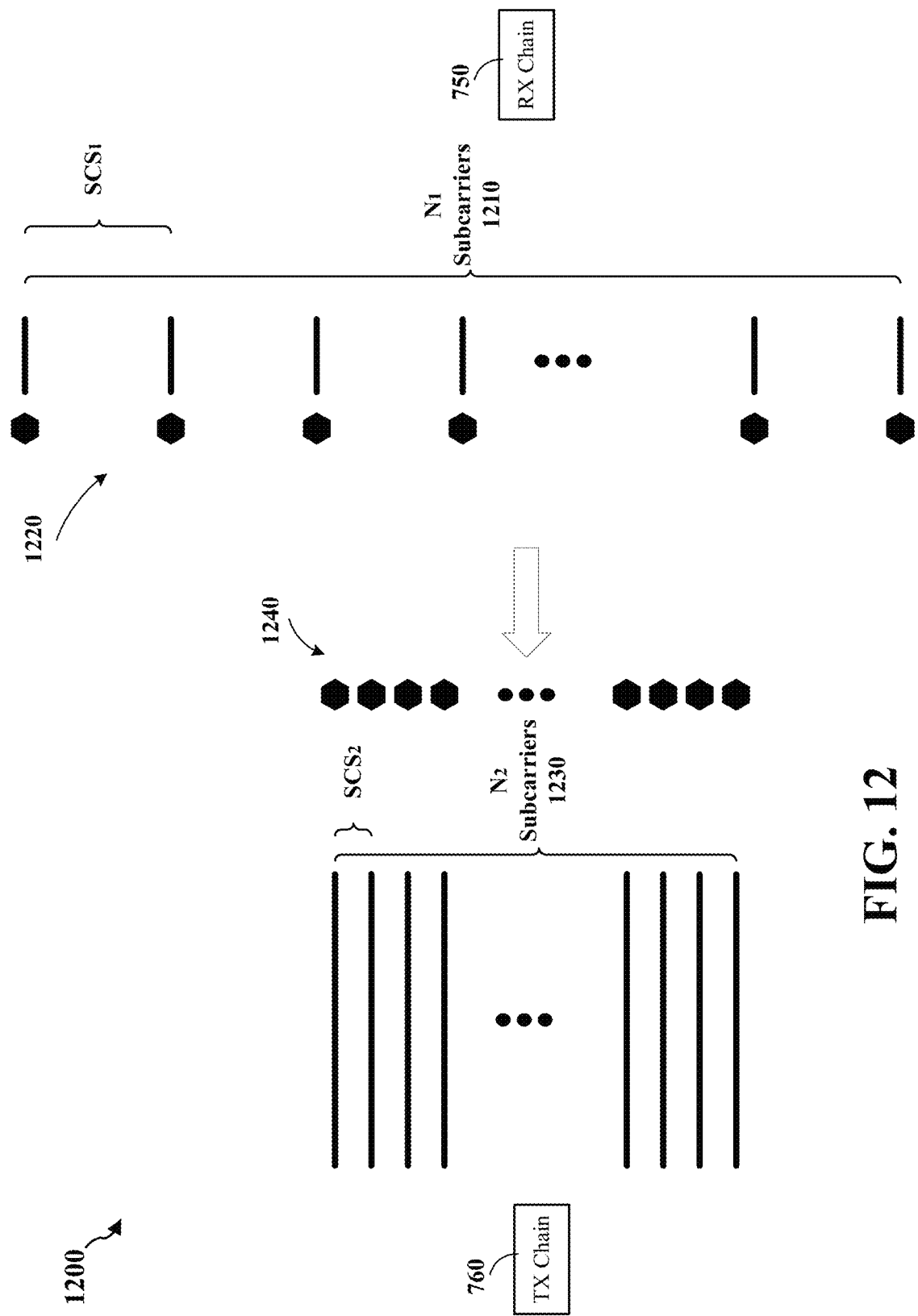
FIG. 12 is a diagram illustrating signal transformation at a repeater.

FIG. 12 is a diagram 1200 illustrating signal transformation at a repeater. Using the reception antenna 722-1 of the repeater 706-1 as an example, the FFT component 751 of the reception antenna 722-1 has a size $N_1$. The filtered digital samples from the conversion component 754 are passed through a down-sampling block, when necessary, to convert the data rate of the digital sample stream to match the FFT size $N_1$. Accordingly, the positions of the OFDM symbols can be determined in the down converted digital samples. Once digital samples within an OFDM symbol are found, the CP removal component 753 removes the cyclic prefix (CP) used to prevent inter-symbol interference (ISI). The serial to parallel component 752 groups $N_1$ data samples as an input vector for the FFT component 751. The FFT component 751 outputs $N_1$ modulation symbols $\tilde{g}_{k,1}$ 1220, which are a combination of $s_{k,1}$ to $s_{k,2}$ as received at the reception antenna 722-1 of the repeater 706-1. Further, the $N_1$ modulation symbols $\tilde{g}_{k,1}$ 1220 are carried on $N_1$ subcarriers 1210 with a $SCS_1$.

As described supra, each of the repeaters 706-1 ... 706-K has transmission antennas 724-1, 724-2 and uses a respective transmission chain 760 to generate RF signals to be transmitted through each transmission antenna. Further, each transmission chain 760 corresponds to a respective reception chain 750. As described infra, modulation symbols received through a reception antenna of the repeater are retransmitted through a corresponding transmission antenna.

Using the repeater 706-1 as an example ($M_r=M_t=M=2$), the reception antennas 722-1, 722-2 correspond to the transmission antennas 724-1, 724-2. More specifically, $g_{k,1}$ 1220 received through the reception chain 750 of the reception antenna 722-1 are retransmitted through the transmission chain 760 of the transmission antenna 724-1. In a more general case with $M_r \neq M_t$, a mapping from the $M_t$ transmission antennas to the $M_r$ reception antennas is needed and may be provided by a linear transformation matrix. In other words, $N_2$ modulation symbols $m_{k,1}$ 1240, which are inputs for retransmitting through the transmission chain 760 of the transmission antenna 724-1 are selected from or are linear combination of $\tilde{g}_{k,1}$ received in the reception antenna 722-1. If $M_r$ is equal to $M_t$, the linear transformation matrix can be simply an identity matrix representing one-to-one mapping between one reception antenna and one transmission antenna.

The transmission chain 760 uses $N_2$ subcarriers 1230 having a $SCS_2$. The IFFT component 761 uses $N_2$ points and has $N_2$ inputs/outputs. The repeater 706-1 is configured with a predetermined rule that maps the $N_1$ outputs of the FFT component 751 to the $N_2$ inputs of the IFFT component 761.

More specifically, the repeater 706-1 applies a group of $N_2$ modulation symbols $m_{k,1}$ 1240 to the $N_2$ subcarriers 1230 in an OFDM symbol B. The $N_2$ subcarriers 1230 carrying the $N_2$ modulation symbols $m_{k,1}$ 1240 are sent to the IFFT component 761 with $N_2$ inputs. The $N_2$ digital samples output from the IFFT component 761 are treated as a time sequence and sent to the parallel to serial component 762 to form a time domain signal. The CP insertion component 763 receives the time domain signal and adds a cyclic prefix, resulting a time domain signal spanning an OFDM symbol B, which corresponds to $SCS_2$. The resulting time domain signal is in digital form, and is processed through a conversion component 764 that includes a rate converter and/or filter(s) to achieve a desired sample rate. The converted time domain signal in digital form is sent to the digital-to-analog converter 765, which accordingly generates an analog time domain signal. Subsequently, the up converter 766 receives the analog time domain signal and mixes the analog time domain signal with a second carrier frequency ($f_2$) to generate a RF signal. The RF signal is transmitted through the transmission antenna 724-1 of the repeater 706-1. In particular, the second carrier frequency of the RF signals transmitted from the repeaters 706-1 ... 706-K may be in FR1.

Referring back to FIG. 7, in certain configurations, modulation symbols to be transmitted through an $i^{th}$ antenna port (e.g., the $1^{st}$ antenna port corresponding to the antenna 712-1) of the UE 704 in a $k^{th}$ OFDM symbol A are denoted as $z_{k,i}$ with $z_{k,i} \in \mathbb{C}^{N_2 \times 1}$. $z_{k,i}$ are mapped to the selected $N_2$ (e.g., 1024) inputs out of total $N_1$ inputs (e.g., 4096), denoted as $\tilde{z}_{k,i} \in \mathbb{C}^{N_1 \times 1}$, of the IFFT component 741 according to an invertible mapping function $f(i)$, where $z_{k,i}=[z_{k,i,0}, z_{k,i,1}, \ldots, z_{k,i,N_2-1}]^T$ and $\tilde{z}_{k,i}=[\tilde{z}_{k,i,0}, \tilde{z}_{k,i,1}, \ldots, \tilde{z}_{k,i,N_1-1}]^T$. $f(i)$ returns the index in $\tilde{z}_{k,i}$ that is mapped from the $i^{th}$ element in $z_{k,i}$. That is, the function $f(i)$ gives the index in the transformed vector $\tilde{z}_{k,i}$ that corresponds to the $i^{th}$ element in the original vector $z_{k,i}$. As an example, the function can be defined as $$f(i) = i + \frac{N_1 - N_2}{2}.$$

Accordingly, it can be determined that $$\tilde{z}_{k,i} = \left[ 0^T_{\frac{N_1-N_2}{2}} \ z^T_{k,i} \ 0^T_{\frac{N_1-N_2}{2}} \right]^T,$$

where $$0^T_{\frac{N_1-N_2}{2}}$$

is a row vector of zeros with the length $$\frac{N_1 - N_2}{2}.$$

The $N_2$ modulation symbols in $z_{k,i}$ are created by layer mapping and precoding stages in the UE 704 based on encoded data streams. Following the invertible mapping function $f(i)$, the resulting $N_1$ modulation symbols in $\tilde{z}_{k,i}$ are fed into the IFFT component 741 of the transmission chain 740 for the $i^{th}$ antenna port. The IFFT component 741 performs the inverse fast Fourier transform on the input vector to generate a time-domain signal with $N_1$ samples. After the IFFT operation, the parallel to serial component 742 processes the $N_1$ time-domain samples and outputs a single time-domain signal. The CP insertion component 743 adds a cyclic prefix to this time-domain signal, resulting in an OFDM symbol A with a subcarrier spacing of $SCS_1$. The output signal from the CP insertion component 743 is then sent to the conversion component 744, which performs rate conversion and filtering to adapt the signal for transmission. The digital-to-analog converter 745 subsequently converts the processed digital signal into an analog signal, which is then mixed with the first carrier frequency $f_1$ by the up converter 746. The mixed signal is then transmitted through the transmission antenna corresponding to the $i^{th}$ antenna port (e.g., the antenna 712-1 or 712-2) of the UE 704.

As described supra, the repeaters 706-1 . . . 706-K receives the RF signals from the UE 704 and processes the received RF signals. In particular, as described supra, the inverse function $$f^{-1}(i) = i - \frac{N_1 - N_2}{2}$$

is utilized to map $\tilde{g}_{k,i}$ to $m_{k,i}$ at the repeaters 706-1 . . . 706-K. As a result, the input vector $m_{k,i}$ of the IFFT component 761 can be expressed as $$\left[ 0^T_{\frac{N_1-N_2}{2}} \; \tilde{g}^T_{k,i} \; 0^T_{\frac{N_1-N_2}{2}} \right]^T$$

at the repeaters 706-1 . . . 706-K.

Accordingly, the repeaters 706-1 . . . 706-K can use an option described infra to construct $m_{k,i}$, which are the input vector of the IFFT component 761, based on $\tilde{g}_{k,i}$. The mapping from $\tilde{g}_{k,i} = [\tilde{g}_{k,i,0}, \ldots, \tilde{g}_{k,i,N_2-1}]^T$ to $m_{k,i} = [m_{k,i,0}, \ldots, m_{k,i,N_2-1}]^T$ is determined according to a rule that maps $z_{k,i} = [z_{k,i,0}, \ldots, z_{k,i,N_2-1}]^T$ to $\tilde{z}_{k,i} = [\tilde{z}_{k,i,0}, \ldots, \tilde{z}_{k,i,N_1-1}]^T$ in a transmission (Tx) chain of the UE 704. $m_{k,i} \in \mathbb{C}^{N_2 \times 1}$ are the inputs of the IFFT function in the Tx-chain of the repeater 706-1, $z_{k,i} \in \mathbb{C}^{N_2 \times 1}$ carry the baseband signal in the frequency domain for the Tx antenna port directed to the Tx-chain of the UE 704, and $\tilde{z}_{k,i} \in \mathbb{C}^{N_1 \times 1}$ are the inputs of the IFFT at the UE 704. $N_2$ elements of $\tilde{z}_{k,i}$ are one-to-one mapped from all the elements in $z_{k,i}$. An invertible mapping, denoted as $f(i)$ returns the index in $\tilde{z}_{k,i}$ that is mapped from the i-th element in $z_{k,i}$. For the other elements not in the range of $f(\cdot)$, one option is to set them to zeros. Then the mapping from $\tilde{g}_{k,i}$ to $m_{k,i}$ is done by the inverse function $f^{-1}(\cdot)$ that takes the elements whose indexes are in the range of $f(\cdot)$. For example, given the invertible function $$f(i) = i + \frac{N_1 - N_2}{2},$$

we have $z_{k,i} = [0^T_{(N_1-N_2)/2} \; z_{k,i}^T \; 0^T_{(N_2-N_1)/2}]^T$, where $0_{(N_2-N_1)/2}$ is a zero vector of size $(N_2-N_1)/2$. Then $m_{k,i}$ is taken from the center $N_2$ elements of $g_{k,i}$. Finally, IFFT component 761 is obtained from $m_{k,i}$ through the $N_2$-point FFT function and then the P-to-S conversion in the Tx chain.

Figure 13:
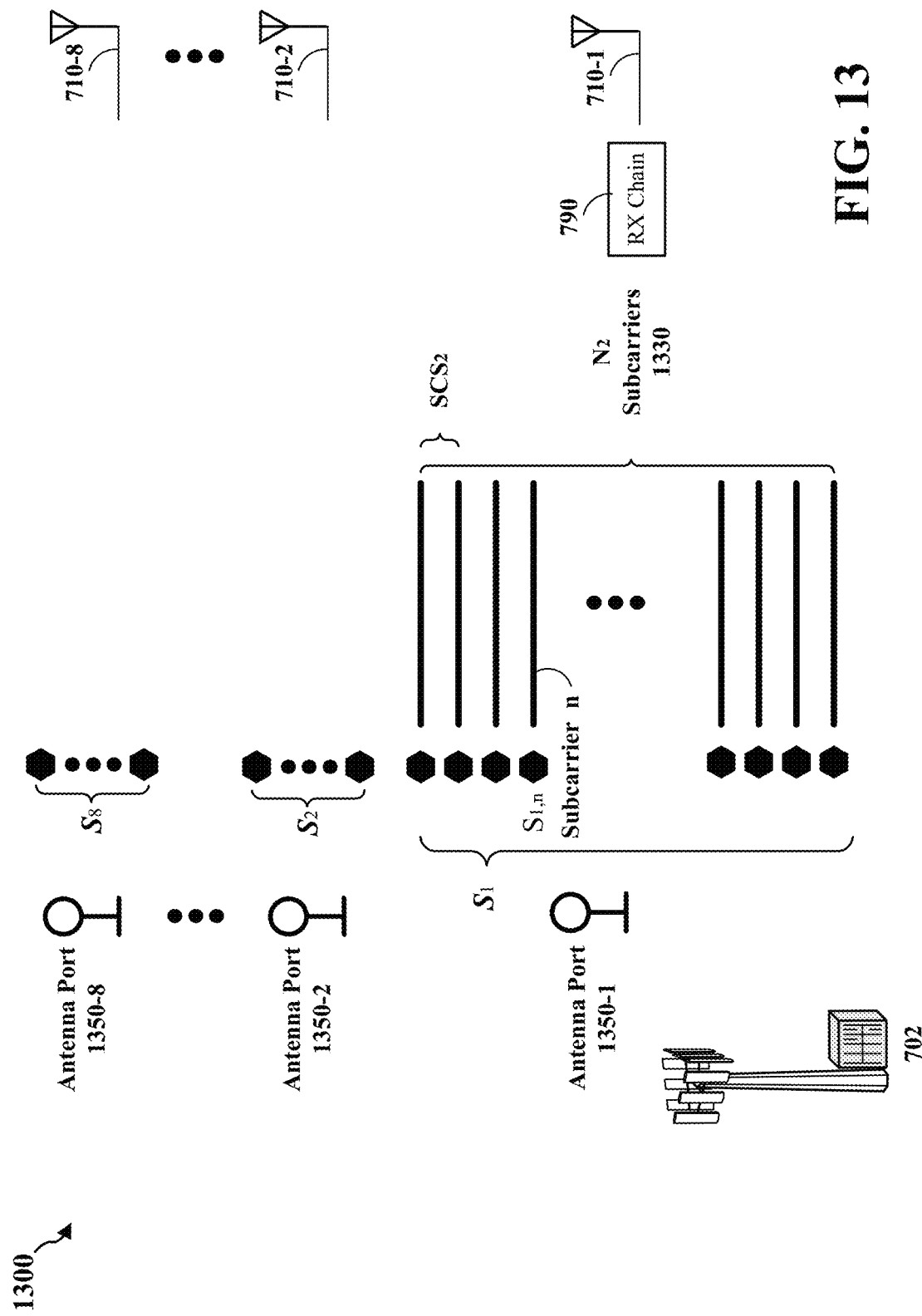
FIG. 13 is a diagram illustrating signal reception at a base station.

FIG. 13 is a diagram 1300 illustrating signal reception at the base station 702. In general, the base station 702 have $N_R$ reception antenna ports. In this example, each reception antenna corresponding to a reception antenna. (That is, there are $N_R$ antennas.) In other examples, each reception antenna port may be associated with one or multiple physical antennas, and may be referred to as a beamformed antenna port. In this example, the base station 702 has reception antennas 710-1, 710-2, . . . 710-8 corresponding to antenna ports 1350-1 to 1350-8.

RF signals received at each reception antenna of the base station 702 are processed through a respective reception chain 790. Similar to a reception chain 750 of a repeater, the reception chain 790 includes an FFT component 791, a serial to parallel component 792, a CP removal component 793, filter(s) 794, an analog-to-digital converter 795, and a down converter 796.

More specifically, the base station 702 receives the RF signals from the repeaters 706-1 . . . 706-K and extracts, from the RF signals, baseband signals $r_n$ carried on the $n^{th}$ subcarrier of the $N_2$ subcarriers 1330. $r_n$ is a vector $[s_{1,n}, \ldots, s_{8,n}]^T$, where $s_{i,n}$ is the baseband signal received at the $i^{th}$ reception antenna of the base station 702 corresponding to the $n^{th}$ subcarrier. For the $i^{th}$ reception antenna, the received RF signal is first mixed down to baseband with the down converter 796 and converted to digital samples by the analog-to-digital converter 795. The digital samples are filtered using one or more filters 794 to remove out-of-band interference. The CP removal component 793 removes the cyclic prefix before the serial to parallel component 792 groups the filtered digital samples into $N_2$ samples per OFDM symbol. The FFT component 791 then performs an $N_2$-point FFT on these samples to obtain the $N_2$ modulation symbols $s_i = [s_{i,1}, \ldots, s_{i,n}, \ldots, s_{i,n_2}]^T$ at the $i^{th}$ reception antenna corresponding to the $N_2$ subcarriers.

Next, the base station 702 performs signal processing to determine the transmitted baseband data signals x based on the received baseband signals $r_n$ and the knowledge of the system configuration, including the mappings from $z_{k,i}$ to $\tilde{z}_{k,i}$, and from $\tilde{g}_{k,i}$ to $m_{k,i}$. The base station 702 takes into account the mapping rules and the channel estimation information from both the first and second frequencies in its signal processing. The signal processing typically involves decoding signals transmitted via all the RCFT repeaters and the UE 704. In particular, the base station 702 can utilize the mapping provided by the $f(i)$ function to reconstruct the original signals transmitted by the UE 704. This allows the base station 702 to accurately decode the transmitted information and make appropriate decisions based on the recovered data.

The base station 702 performs channel estimation procedures to extract channel state information (CSI) related to the links between the UE 704 and itself. This CSI is useful for determining how to process and decode the received signals optimally. The base station 702 may estimate an equivalent channel response that is formed by precoders used by the UE and a channel between the reception antennas at the base station and the effective antennas at the UE. Further, based on the CSI, the base station 702 may estimate $H_{eq,n}$ described supra, which can be considered as the equivalent channel matrix of the overall system for the n-th subcarrier. This equivalent channel matrix $H_{eq,n}$ considers the effects of all transmissions, multipath fading, and beamforming/precoding techniques employed by the UE 704 and base station 702.

As such, based on $r_n$, $H_{eq,n}$, and $P_{eq,n}$ with respect to the Equation (A) or (B) described supra, the base station 702 can use various multi-antenna signal processing techniques to estimate and decode the transmitted data symbols $x_n$ from the UE 704.

When using the RCFT repeaters-assisted uplink MIMO system, some system parameters and control information need to be shared among the UE 704, the base station (BS)

702, and the RCFT repeaters 706-1, ..., 706-K. This information sharing ensures proper system operation and enables the BS 702 to recover the information transmitted by the UE 704.

The UE 704 needs to receive the following information from the BS 702: (a) available time-frequency resources in the second frequency for UE's transmission; (b) the mapping from $z_{k,i}$ to $\tilde{z}_{k,i}$; and/or (c) the TCI-state or spatial relation for the Tx beam (Tx spatial filtering) used in each $TTI_1$ interval.

In addition, the BS 702 needs to provide the RCFT repeaters 706-1, ..., 706-K with necessary information to receive the UE's transmission in the first frequency and forward the signal in the second frequency. This information may include: (a) frequency band parameters (carrier frequencies) for the first frequency and the second frequency; (b) the associated channel bandwidths ($B_1$, $B_2$) and subcarrier spacings ($SCS_1$, $SCS_2$) in the first frequency and in the second frequency; (c) the TCI-state or spatial relation for Rx beam (Rx spatial filtering) used in each $TTI_1$ interval; and/or (d) the FFT and IFFT sizes ($N_1$, $N_2$), and the mapping from $\tilde{g}_{k,i}$ to $m_{k,i}$.

By providing this information to the UE and the RCFT repeaters, the system ensures efficient data transmission and reception, which can further improve the uplink communication between the UE and the base station.

Figure 14:
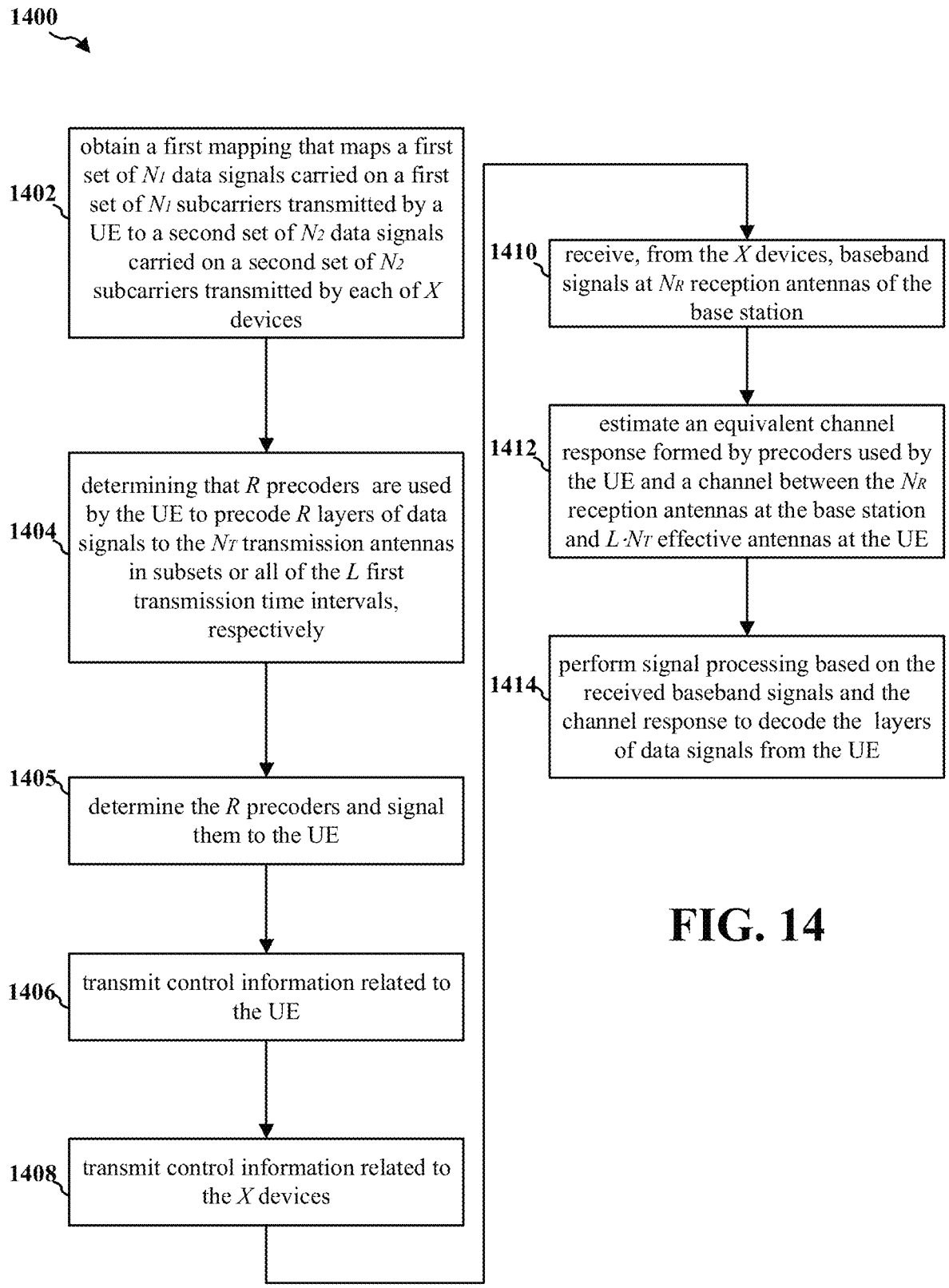
FIG. 14 is a diagram illustrating a method (process) for uplink communications.

FIG. 14 is a diagram 1400 illustrating a method (process) for uplink communications. The method may be performed by a base station. At operation 1402, the base station obtains a first mapping that maps a first set of $N_1$ data signals carried on a first set of $N_1$ subcarriers transmitted by a UE to a second set of $N_2$ data signals carried on a second set of $N_2$ subcarriers transmitted by each of X devices, where $N_1$ and $N_2$ are positive integers.

At operation 1404, the base station determines that R precoders are used by the UE to precode subsets or all of R layers of data signals to the $N_T$ transmission antennas in each of L first transmission time intervals corresponding to a first subcarrier spacing, respectively. The integer L is equal to or greater than the value of X. The baseband signals are received in a second transmission time interval corresponding to a second subcarrier spacing. The second transmission time interval is equal to or greater than the L first transmission time intervals.

At operation 1405, the base station may determine the R precoders and signal them to the UE. The R precoders are determined based on channel state information obtained from the UE or the base station. In certain configurations, each of the L precoders is used by the UE to precode all of the R layers of data signals to the $N_T$ transmission antennas in each of the L first transmission time intervals. In certain configurations, each of the R precoders is used by the UE to precode the subsets of the R layers of data signals to the $N_T$ transmission antennas in each of the L first transmission time intervals.

At operation 1406, the base station transmits control information to the UE. The control information includes at least one of: (a) available time-frequency resources for UE transmission and (b) a transmission control information state or spatial relation for a transmission beam used in each first transmission time interval.

At operation 1408, the base station transmits control information that includes parameters for the X devices to receive radio frequency (RF) signals on a first frequency carrying the R layers of data signals from the UE and to transmit RF signals on a second frequency carrying the R layers to the base station. The control information may include at least one of: (a) frequency band parameters for the first and second frequencies, (b) associated channel bandwidths and subcarrier spacings in the first and second frequencies, (c) a transmission control information state or spatial relation for a reception beam used in each first transmission time interval, (d) fast Fourier transform (FFT) and inverse FFT sizes, and (e) a first mapping that maps a first set of $N_1$ data signals carried on a first set of $N_1$ subcarriers transmitted by the UE to a second set of $N_2$ data signals carried on a second set of $N_2$ subcarriers transmitted by each of the X devices.

At operation 1410, the base station receives, from X devices, baseband signals at $N_R$ reception antennas. The baseband signals carry the R layers of data signals transmitted from a UE using $N_T$ transmission antennas, where $N_R$ and R are positive integers.

At operation 1412, the base station estimates an equivalent channel response formed by precoders used by the UE in L first transmission time intervals and a channel between the $N_R$ reception antennas at the base station and $L \cdot N_T$ effective antennas at the UE, where $N_T$ and L are positive integers.

At operation 1414, the base station performs signal processing based on the received baseband signals and the channel response to decode the R layers of data signals from the UE. The signal processing is performed further based on the first mapping.

The sequence of the operations detailed supra is provided as an example and should not be considered as restrictive. These operations may be reorganized based on different configurations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   receiving, from X devices, baseband signals at $N_R$ reception antennas of the base station, wherein the baseband signals carry R layers of data signals transmitted from a UE using $N^T$ transmission antennas in L first transmission time intervals corresponding to a first subcarrier spacing, X, L, $N_R$ and R being positive integers;
   estimating an equivalent channel response formed by precoders used by the UE and a channel between the $N_R$ reception antennas at the base station and $L \cdot N_T$ effective antennas at the UE, $N_T$ being a positive integer; and
   performing signal processing based on the received baseband signals and the channel response to decode the R layers of data signals from the UE.

2. The method of claim 1, further comprising:
   obtaining a first mapping that maps a first set of $N_1$ data signals carried on a first set of $N_1$ subcarriers transmitted by the UE to a second set of $N_2$ data signals carried on a second set of $N_2$ subcarriers transmitted by each of the X devices, $N_2$ being positive an integer, wherein the signal processing is performed further based on the first mapping.

3. The method of claim 1, further comprising:
   determining that R precoders are used by the UE to precode the R layers of data signals to the $N_T$ transmission antennas in subsets or all of the L first transmission time intervals, respectively, L being further equal to or greater than the value of X, wherein the baseband signals are received in a second transmission time interval corresponding to a second subcarrier spacing, wherein the second transmission time interval is equal to or greater than the L first transmission time intervals.

4. The method of claim 3, wherein the R precoders are determined by the base-station and are signaled to the UE.

5. The method of claim 3, wherein each of the R precoders is used by the UE to precode each of the R layers of data signals to the $N_T$ transmission antennas in all of the L first transmission time intervals.

6. The method of claim 3, wherein each of the R precoders is used by the UE to precode each of the R layers of data signals to the $N_T$ transmission antennas in subsets of the L first transmission time intervals.

7. The method of claim 3, wherein the R precoders are determined based on channel state information obtained from the UE or the base station.

8. The method of claim 1, further comprising:
   transmitting control information to the UE, the control information including at least one of: (a) available time-frequency resources for UE transmission and (b) a transmission control information state or spatial relation for a transmission beam used in each first transmission time interval.

9. The method of claim 1, further comprising:
   transmitting control information, the control information including parameters for the X devices to receive radio frequency (RF) signals on a first frequency carrying the R layers of data signals from the UE and to transmit RF signals on a second frequency carrying the R layers to the base station.

10. The method of claim 9, wherein the control information includes at least one of: (a) frequency band parameters for the first and second frequencies, (b) associated channel bandwidths and subcarrier spacings in the first and second frequencies, (c) a transmission control information state or spatial relation for a reception beam used in each first transmission time interval, (d) fast Fourier transform (FFT) and inverse FFT sizes, and (e) a first mapping that maps a first set of $N_1$ data signals carried on a first set of $N_1$ subcarriers transmitted by the UE to a second set of $N_2$ data signals carried on a second set of $N_2$ subcarriers transmitted by each of the X devices.

11. An apparatus for wireless communication, the apparatus being a base station, comprising:
   a memory; and
   at least one processor coupled to the memory and configured to:
     receive, from X devices, baseband signals at $N_R$ reception antennas of the base station, wherein the baseband signals carry R layers of data signals transmitted from a UE using $N_T$ transmission antennas in L first transmission time intervals corresponding to a first subcarrier spacing, X, L, $N_R$ and R being positive integers;
     estimate an equivalent channel response formed by precoders used by the UE and a channel between the $N_R$ reception antennas at the base station and $L \cdot N_T$ effective antennas at the UE, N being a positive integer; and
     perform signal processing based on the received baseband signals and the channel response to decode the R layers of data signals from the UE.

12. The apparatus of claim 11, wherein the at least one processor is further configured to:
   obtain a first mapping that maps a first set of $N_1$ data signals carried on a first set of $N_1$ subcarriers transmitted by the UE to a second set of $N_2$ data signals carried on a second set of $N_2$ subcarriers transmitted by each of the X devices, $N_2$ being positive an integer, wherein the signal processing is performed further based on the first mapping.

13. The apparatus of claim 11, wherein the at least one processor is further configured to:
   determine that R precoders are used by the UE to precode the R layers of data signals to the $N_T$ transmission antennas in subsets or all of the L first transmission time intervals, respectively, L being further equal to or greater than the value of X, wherein the baseband signals are received in a second transmission time interval corresponding to a second subcarrier spacing, wherein the second transmission time interval is equal to or greater than the L first transmission time intervals.

14. The apparatus of claim 13, wherein the R precoders are determined by the base-station and are signaled to the UE.

15. The apparatus of claim 13, wherein each of the R precoders is used by the UE to precode each of the R layers of data signals to the $N_T$ transmission antennas in all of the L first transmission time intervals.

16. The apparatus of claim 13, wherein each of the R precoders is used by the UE to precode each of the R layers of data signals to the N transmission antennas in subsets of the L first transmission time intervals.

17. The apparatus of claim 13, wherein the R precoders are determined based on channel state information obtained from the UE or the base station.

18. The apparatus of claim 11, wherein the at least one processor is further configured to:
transmit control information to the UE, the control information including at least one of: (a) available time-frequency resources for UE transmission and (b) a transmission control information state or spatial relation for a transmission beam used in each first transmission time interval.

19. The apparatus of claim 11, wherein the at least one processor is further configured to:
transmit control information, the control information including parameters for the X devices to receive radio frequency (RF) signals on a first frequency carrying the R layers of data signals from the UE and to transmit RF signals on a second frequency carrying the R layers to the base station.

20. A non-transitory computer-readable medium storing computer executable code for wireless communication of a base station, comprising code to:
receive, from X devices, baseband signals at $N_R$ reception antennas of the base station, wherein the baseband signals carry R layers of data signals transmitted from a UE using $N_T$ transmission antennas in L first transmission time intervals corresponding to a first subcarrier spacing, X, L, $N_R$ and R being positive integers;
estimate an equivalent channel response formed by precoders used by the UE and a channel between the $N_R$ reception antennas at the base station and $L \cdot N_T$ effective antennas at the UE, $N_T$ being a positive integer; and
perform signal processing based on the received baseband signals and the channel response to decode the R layers of data signals from the UE.

* * * * *